(12) United States Patent
Katayanagi

(10) Patent No.: US 8,353,727 B2
(45) Date of Patent: Jan. 15, 2013

(54) CARD CONNECTOR

(75) Inventor: Masayuki Katayanagi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 13/213,250

(22) Filed: Aug. 19, 2011

(65) Prior Publication Data
US 2012/0164872 A1    Jun. 28, 2012

(30) Foreign Application Priority Data
Dec. 28, 2010 (JP) ................................. 2010-292756

(51) Int. Cl.
*H01R 14/00* (2006.01)
(52) U.S. Cl. ...................................................... 439/630
(58) Field of Classification Search .................. 439/630, 439/541.5, 64, 79
See application file for complete search history.

(56) References Cited

U.S. PATENT DOCUMENTS

| 6,540,523 | B1* | 4/2003 | Kung et al. | 439/64 |
| 6,587,348 | B2* | 7/2003 | Kondo | 361/741 |
| 6,721,186 | B2* | 4/2004 | Yang | 361/737 |
| 6,783,399 | B2* | 8/2004 | Joung | 439/630 |
| 2006/0105634 | A1* | 5/2006 | Wu et al. | 439/630 |

FOREIGN PATENT DOCUMENTS
JP    4204523 B2    10/2008

\* cited by examiner

*Primary Examiner* — Neil Abrams
*Assistant Examiner* — Phuongchi Nguyen
(74) *Attorney, Agent, or Firm* — Holtz, Holtz, Goodman & Chick, PC

(57) ABSTRACT

A connector which makes it less difficult to insert two types of card-type electronic components, even when it is used over a long term. A first recess in which a first memory card is inserted has a bottom surface formed with a second recess in which a second memory card is inserted, whereby guiding surfaces are formed for guiding a second memory card in a card-inserting direction.

12 Claims, 29 Drawing Sheets

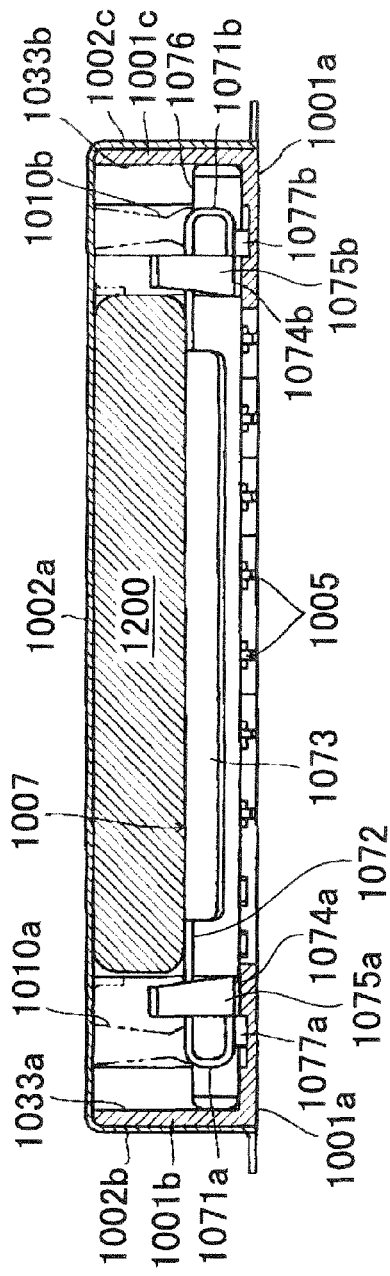
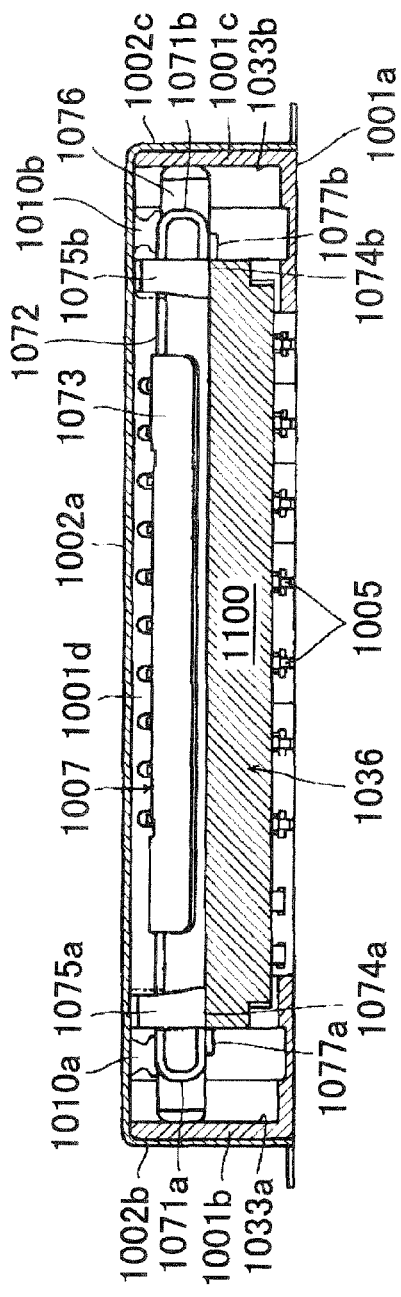
FIG. 29A RELATED ART
FIG. 29B RELATED ART

CARD CONNECTOR

BACKGROUND OF THE INVENTION

1. Field of the Invention

This invention relates to a connector.

2. Description of the Related Art

Conventionally, there has been known a card connector which is available for two types of memory cards which are different in width and length (see Japanese Patent No. 4204523).

FIGS. 24 to 29B illustrate the above-mentioned card connector, and FIGS. 1, 2, 7(a) to 7(d), 4, 5(a), 5(b), 6(a), and 6(b) described in Japanese Patent No. 4204523, correspond to FIGS. 24, 25, 26A to 26D, 27, 28A, 28B, 29A and 29B, respectively. As shown in FIGS. 24 to 29B, a housing 1003 is formed of an insulating material, such as a synthetic resin, and comprises a body 1001 having insulating properties and including a bottom board 1001a, opposite side walls 1001b and 1001c, and a rear wall 1001d, and a cover 1002, which has electrically conductive properties and is formed of a metal plate, including a top board 1002a, and opposite side boards 1002b and 1002c. The front of the housing 1003 is open and is formed with a slot (card insertion space) 1004 into which a first card 1100 and a second card 1200 can be inserted.

A card selector 1007 is accommodated in the housing 1003. The card selector 1007 is a member for distinguishing whether a card inserted into the slot 1004 is the first card 1100 or the second card 1200 and selectively receiving the first card 1100 into a lower area within the slot 1004 and the second card 1200 into an upper area within the same.

The card selector 1007 is formed by blanking and bending a thin metal plate. The card selector 1007 integrally includes an upper card insertion slot-forming board 1072, an introduction guide portion 1073, protruding pieces 1074a and 1074b, and push-up guide portions 1075a and 1075b. The card selector 1007 further includes a selector shaft 1076. The upper card insertion slot-forming board 1072 has opposite ends formed with L-shaped leg portions 1071a and 1071b, respectively. The distance between the leg portions 1071a and 1071b is wider than a lateral width of the first card 1100. The introduction guide portion 1073 is continuous with a front end of the upper card insertion slot-forming board 1072. The introduction guide portion 1073 is sloped in a manner descending forward. The protruding pieces 1074a and 1074b protrude toward each other from respective lower end parts of the leg portions 1071a and 1071b. The distance between the protruding pieces 1074a and 1074b is slightly narrower than the lateral width of the first card 1100. The push-up guide portions 1075a and 1075b are continuous with respective front ends of the protruding pieces 1074a and 1074b, extend along a card-inserting direction, and are sloped in a manner ascending forward.

Upper shaft-holding portions 1079a and 1079b are continuous with respective rear ends of the opposite ends of the upper card insertion slot-forming board 1072. Bearings 1077a and 1077b are continuous with respective rear ends of lower end pieces of the leg portions 1071a and 1071b.

The selector shaft 1076 is sandwiched between the bearings 1077a and 1077b, and the upper shaft-holding portions 1079a and 1079b. Further, the selector shaft 1076 has opposite ends inserted in guiding grooves 1033a and 1033b, respectively, which are formed in the left side wall 1001b and the right side wall 1001c of the body 1001, respectively. With this arrangement, the selector shaft 1076 can move up and down in a state being parallel to a width direction of the body 1001. Further, the selector shaft 1076 is urged downward by right and left plate-shaped springs 1010a and 1010b, which are formed on the top board 1002a of the cover 1002, to thereby return to the initial position.

When the first card 1100 is inserted into the slot 1004, the push-up guide portions 1075a and 1075b are pushed up by a front end of the first card 1100, whereby the upper card insertion slot-forming board 1072 and the introduction guide portion 1073 move upward, to thereby form a lower card insertion slot 1036 into which the first card 1100 can be inserted. Therefore, it is possible to more deeply insert the first card 1100.

When the second card 1200 is inserted into the slot 1004, since the second card 1200 is not brought into contact with the push-up guide portions 1075a and 1075b, the selector shaft 1076 remains in the initial position thereof, so that the second card 1200 climbs onto the introduction guide portion 1073 which is at a location frontward of the selector shaft 1076, and is guided to the upper area within the slot 1004. Therefore, it is possible to more deeply insert the second card 1200.

When a front end of the second card 1200 inserted into the slot 1004 reaches a position above the upper card insertion slot-forming board 1072, if the second card 1200 is inclined due to some cause, the upper card insertion slot-forming board 1072 may be deformed by the front end of the second card 1200.

Further, when an amount of deformation of the upper card insertion slot-forming board 1072 becomes larger due to long-term use of the card connector, the function of the card selector 1007 for selectively receiving the first and second cards 1100 and 1200 is degraded, which may cause a difficulty in inserting the cards 1100 and 1200.

SUMMARY OF THE INVENTION

The present invention has been made in view of these circumstances, and an object thereof is to provide a connector which makes it less difficult to insert two types of card-type electronic components even when the connector is used over a long term.

To attain the above object, the present invention provides a connector comprising a housing that has a first recess for having a first card-type electronic component inserted therein, and a second recess which is formed in a bottom surface of the first recess, for having a second card-type electronic component inserted therein, and is smaller in width than the first card-type electronic component, the first recess having a guiding surface for guiding the first card-type electronic component in a card-inserting direction, the second recess having a guiding surface for guiding the second card-type electronic component in the card-inserting direction, and card-selecting means for restricting movement of the first card-type electronic component inserted in the first recess in a height direction of the housing, restricting movement of the second card-type electronic component inserted in the second recess in the height direction, allowing the first card-type electronic component to be inserted into the first recess, and preventing the second card-type electronic component from being inserted in the first recess.

Preferably, the card-selecting means comprises a cover member that is mounted on the housing in a manner covering the first recess, a movable member that includes a projecting portion which protrudes into the first recess through a window formed in the cover member, prevents the second card-type electronic component inserted in the second recess from moving in the height direction, prevents the second card-type electronic component from being inserted into the first recess, and is mounted on the cover member in a manner capable of moving in the card-inserting direction and the height direction, an urging member for urging the movable member in a card-discharging direction when the movable member is moved in the card-inserting direction with respect to the cover member, connecting means for connecting the cover member and the movable member to each other, and releasing connection of the cover member and the movable member to enable the movable member to move, when a front end of the first card-type electronic component is inserted into the first recess, and movement conversion means operable when the movable member is moved in the card-inserting direction together with the first card-type electronic component after the connection of the cover member and the movable member is released and the first card-type electronic component is brought into abutment with the projecting portion, to convert movement of the movable member in the card-inserting direction to movement in the height direction to thereby move the movable member in the height direction.

More preferably, the connection means includes lock spring portions which are formed on the movable member and are each bent in a manner protruding into the first recess, and holes which are formed in the cover member, and are each capable of being engaged with a hook portion formed on a front end of each lock spring portion, and wherein when the front end of the first card-type electronic component is inserted into the first recess against the urging force of the urging member, the engagement of the hook portions of the lock spring portions and the holes is released, to thereby release the connection of the cover member and the movable member, and when the first card-type electronic component is discharged from the first recess, the urging force of the urging member causes the movable member to return to a position before inserting the first card-type electronic component, and the hook portions of the lock spring portions and the holes are engaged with each other, to thereby connect the cover member and the movable member.

Preferably, the movement conversion means comprises protrusions formed on opposite side surfaces of the cover member, and cam holes formed in opposite sides of the movable member, such that the protrusions relatively slide therein when the movable member is moved.

Preferably, the movement conversion means comprises cam holes formed in opposite sides of the cover member, and protrusions formed on opposite side surfaces of the movable member, such that the protrusions relatively slide in the cam holes when the movable member is moved.

Preferably, first contact portions are arranged on the bottom surface of the first recess, for being brought into contact with the first card-type electronic component, second contact portions are arranged on a bottom surface of the second recess at locations frontward of the first contact portions, for being brought into contact with the second card-type electronic component, and wherein each second contact portion has a height dimension smaller in value than a depth dimension of the second recess.

According to this invention, it is possible to provide a connector which makes it less difficult to insert two types of card-type electronic components even when the connector is used over a long term.

The above and other objects, features and advantages of the present invention will become more apparent from the following detailed description taken in conjunction with the accompanying drawings.

BRIEF DESCRIPTION OF THE DRAWINGS

FIGS. 26A to 26D are views of the appearance of a card selector with a selector shaft, in which FIG. 26A is a perspective view of the card selector, FIG. 26B is a plan view of the card selector, FIG. 26C is a front view of the card selector, and FIG. 26D is a right side view of the card selector;

FIGS. 28A and 28B are explanatory side views of the card selecting mechanism with the selector shaft, in which FIG. 28A is a view of a state in which the second card is inserted, and FIG. 28B is a view of a state in which the first card is inserted; and FIGS. 29A and 29B are explanatory front views of the card selecting mechanism with the selector shaft, in which FIG.

29A is a view of the state in which the second card is inserted, and FIG. 29B is a view of the state in which the first card is inserted.

DETAILED DESCRIPTION OF THE PREFERRED EMBODIMENTS

Figure 1:
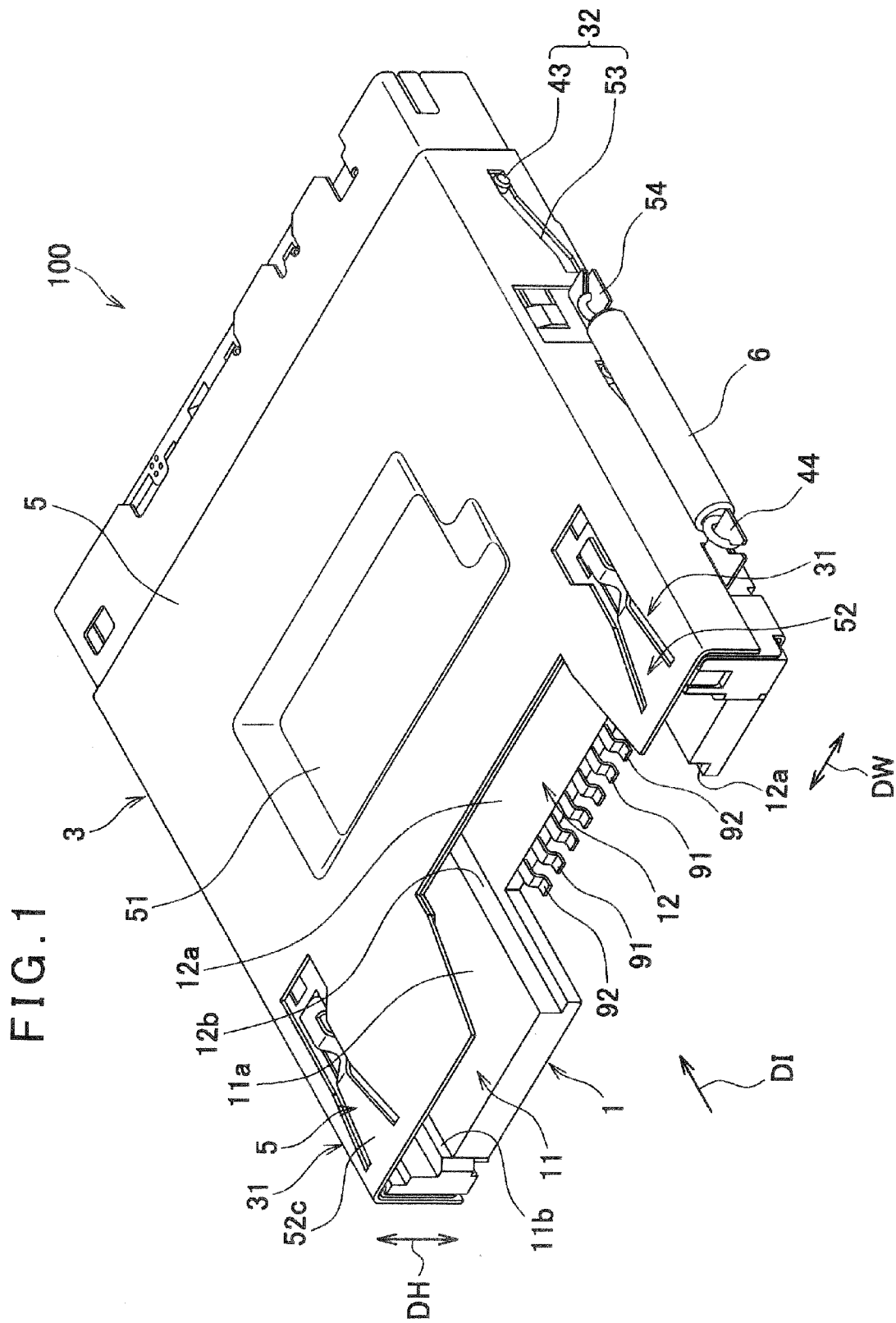
FIG. 1 is a perspective view of a connector according to an embodiment of the present invention.
Figure 2:
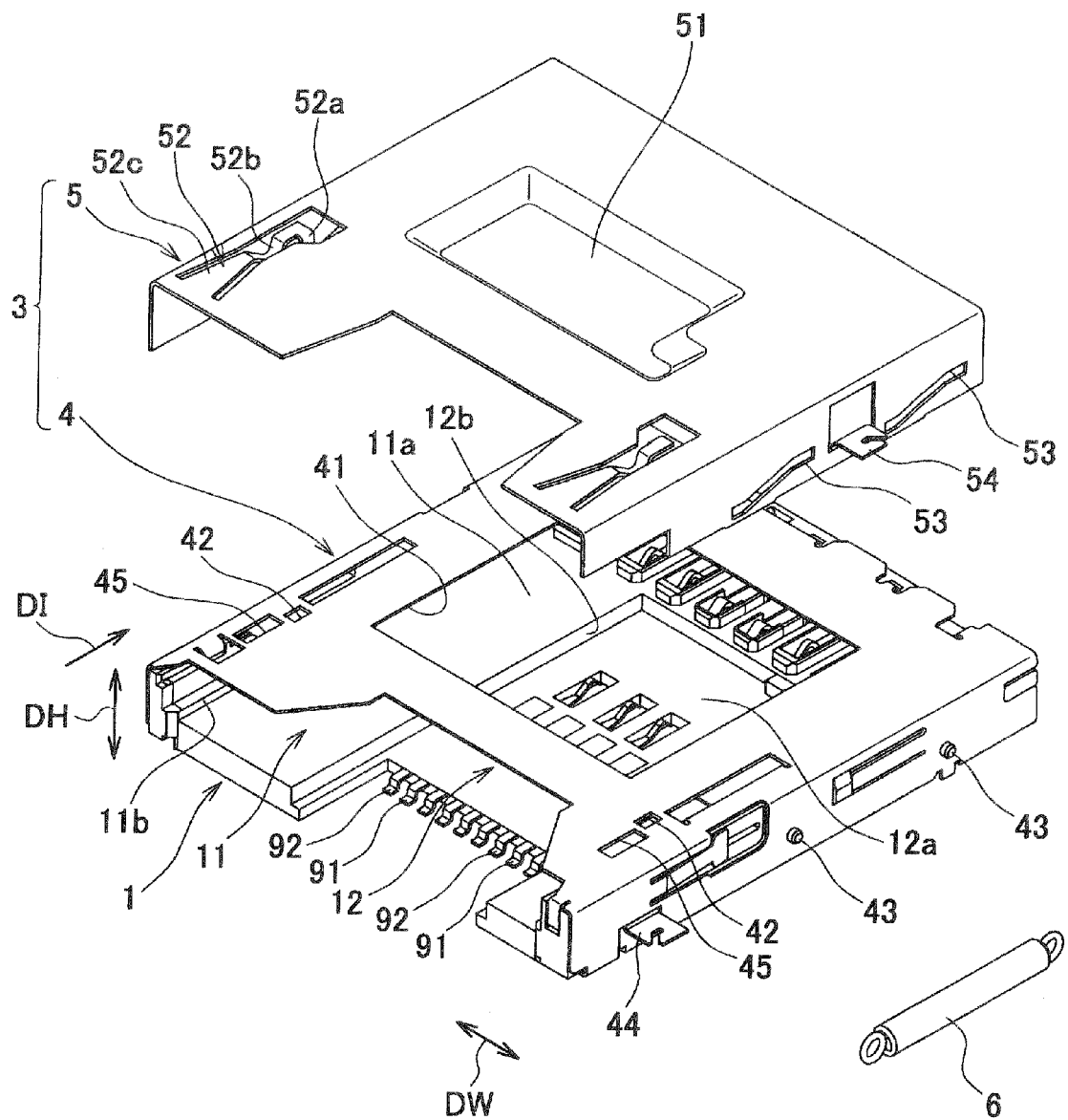
FIG. 2 is an exploded perspective view of the connector shown in FIG. 1.
Figure 3:
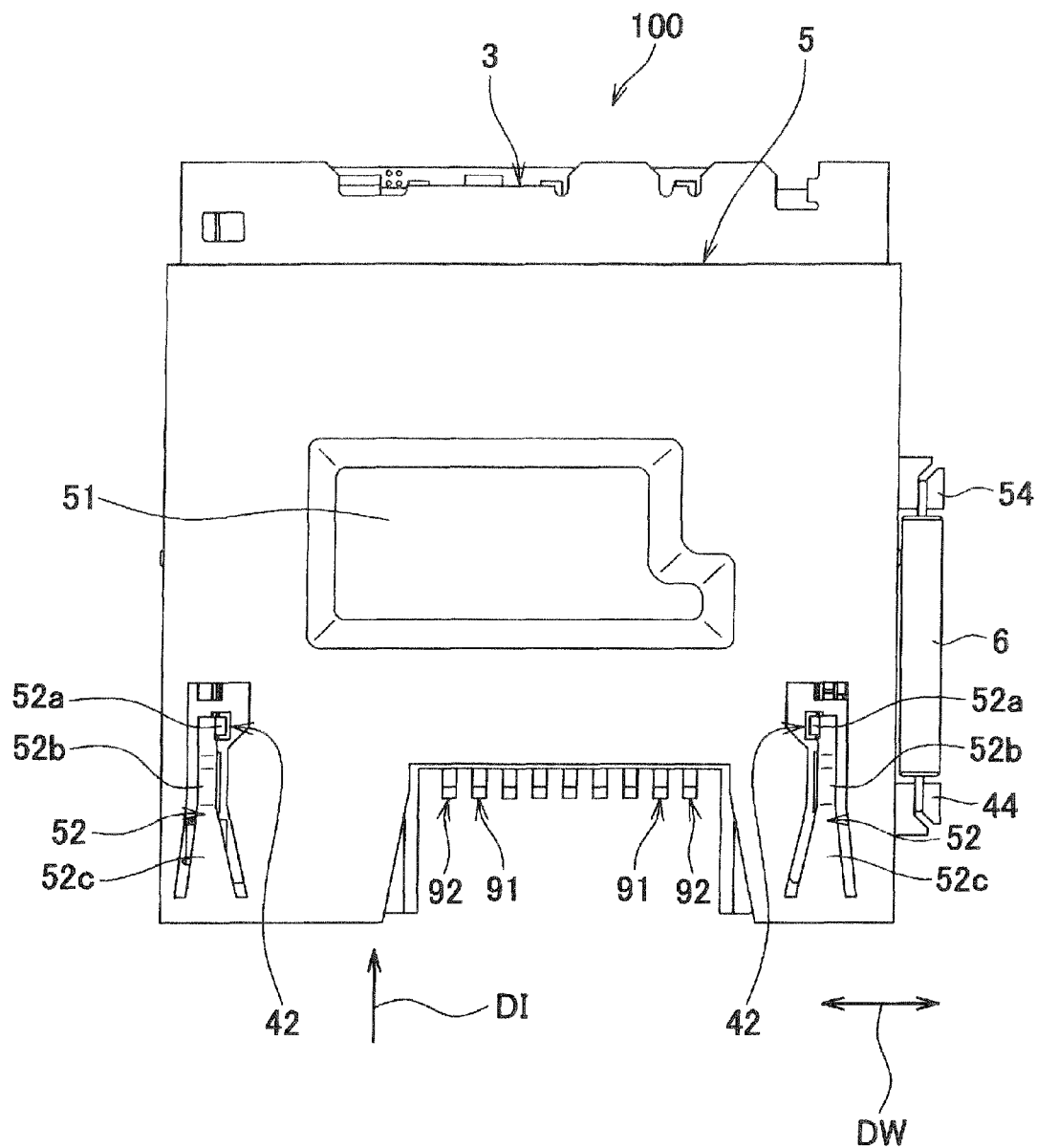
FIG. 3 is a plan view of the connector shown in FIG. 1.
Figure 4:
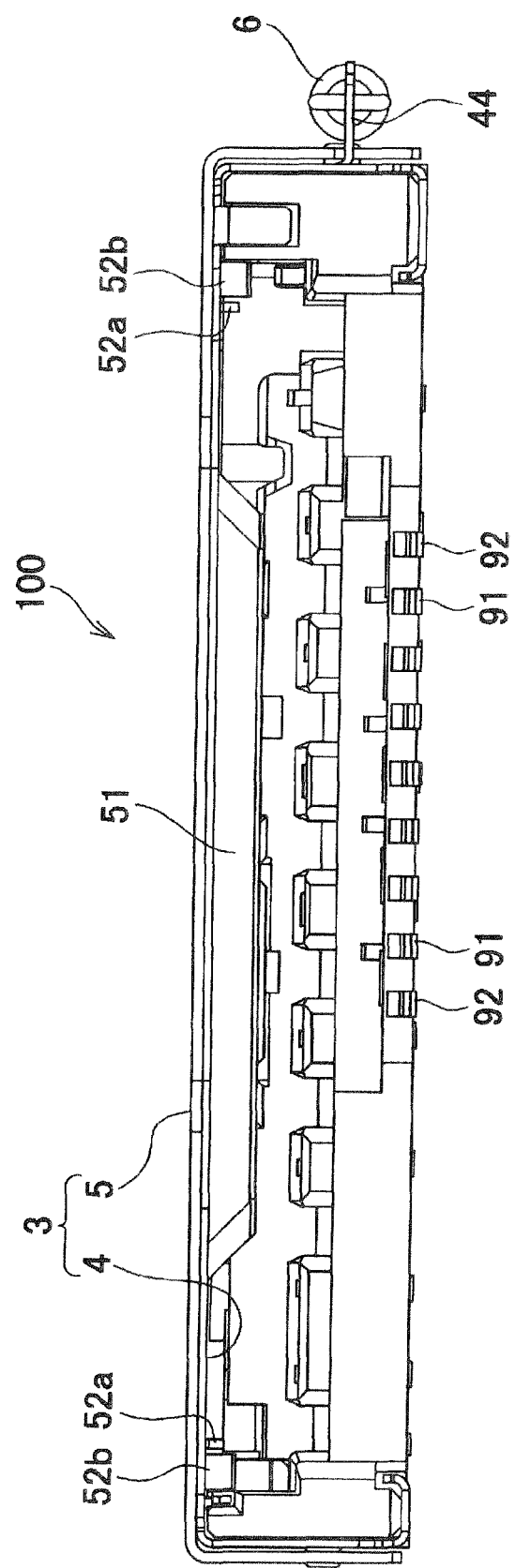
FIG. 4 is a front view of the connector shown in FIG. 1.
Figure 5:
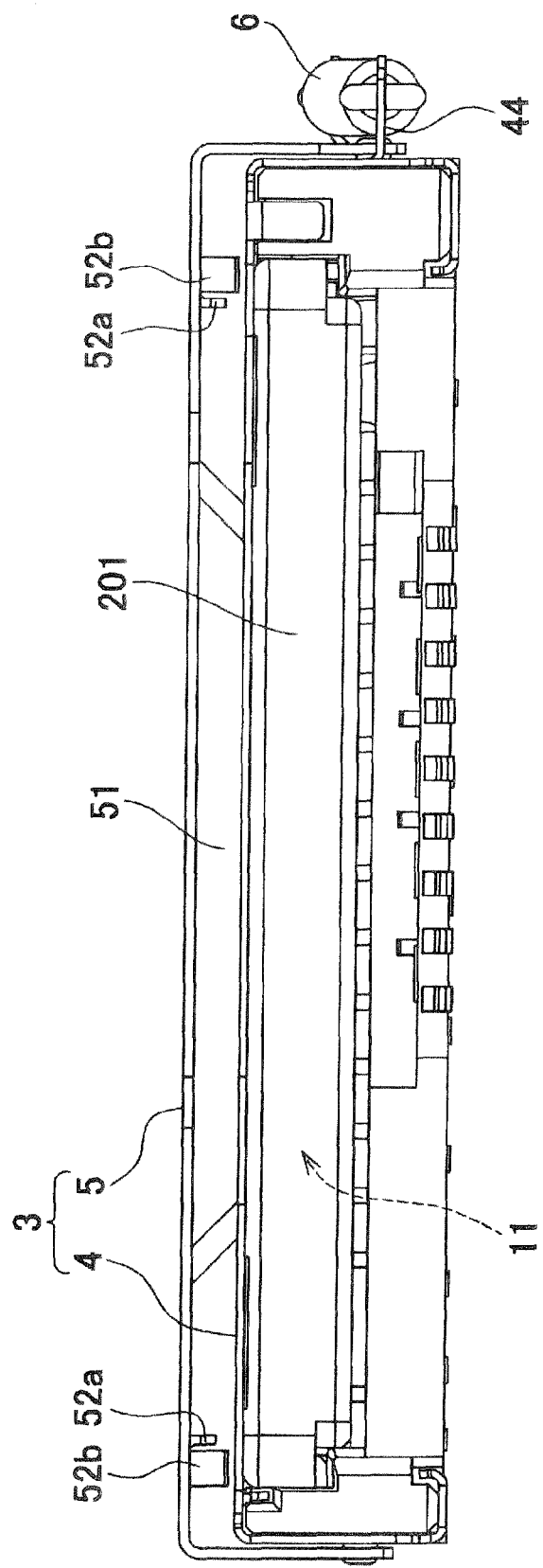
FIG. 5 is a front view of the connector shown in FIG. 1 in a state in which a first memory card is inserted therein.
Figure 6:
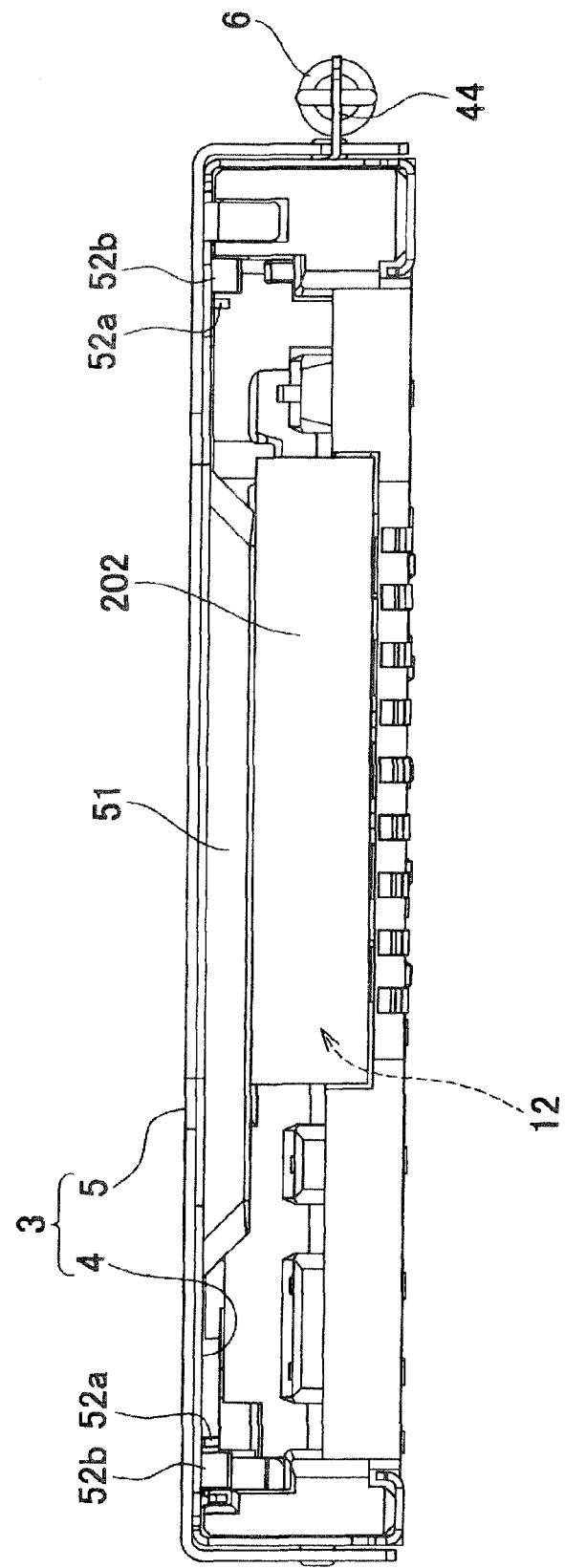
FIG. 6 is a front view of the connector shown in FIG. 1 in a state in which a second memory card is inserted therein.
Figure 7:
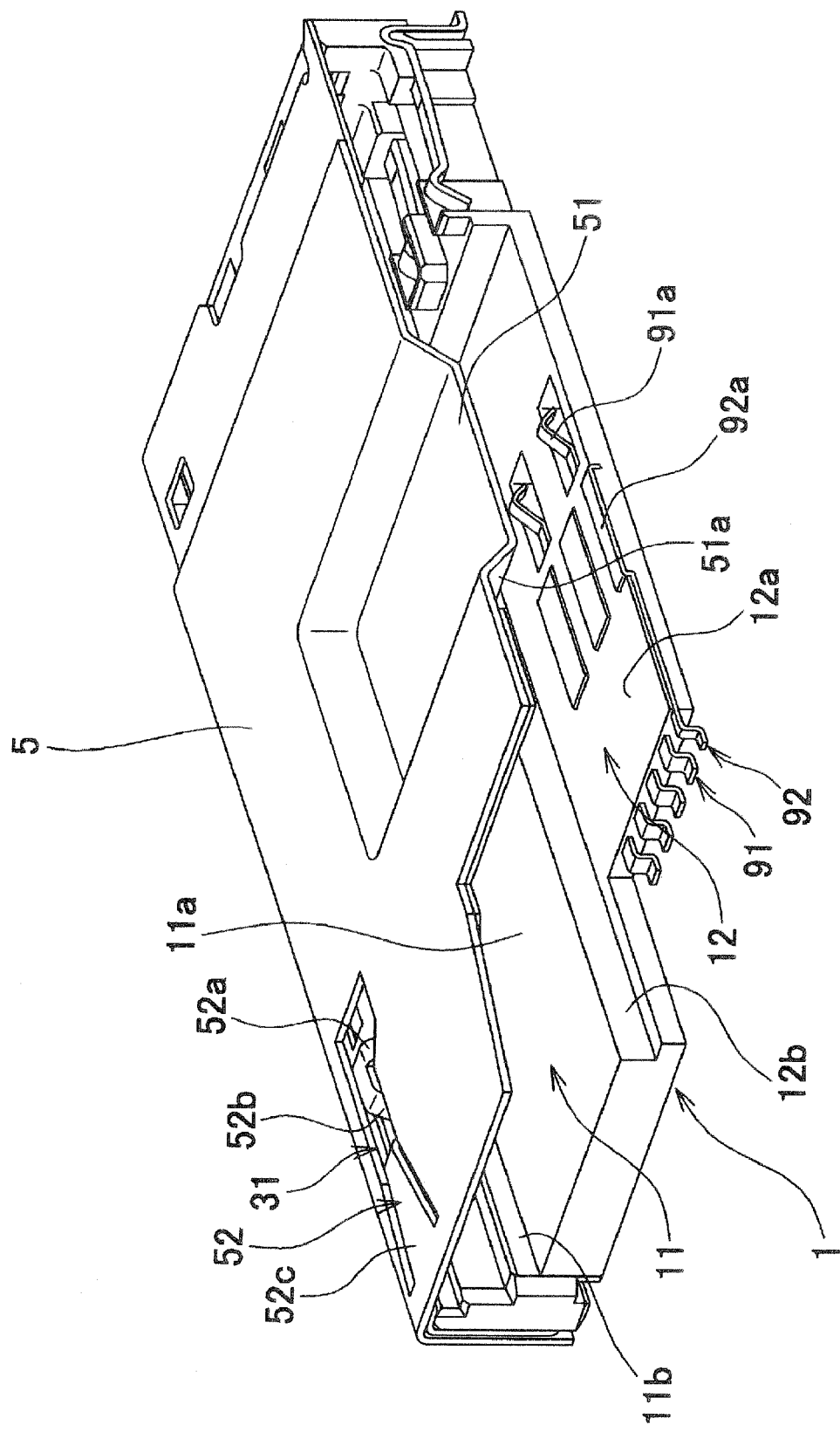
FIG. 7 is a cutaway perspective view of the connector shown in FIG. 1 is cut.
Figure 8:
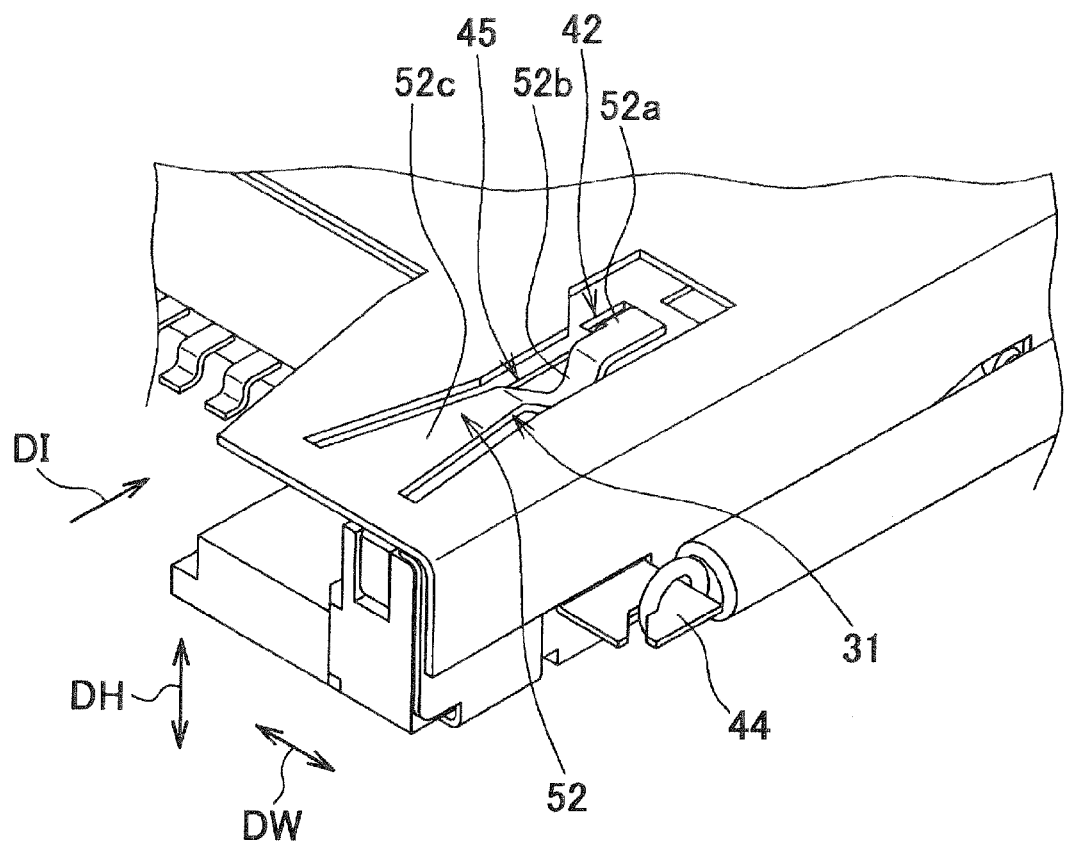
FIG. 8 is a partial enlarged view of FIG. 1.
Figure 9:
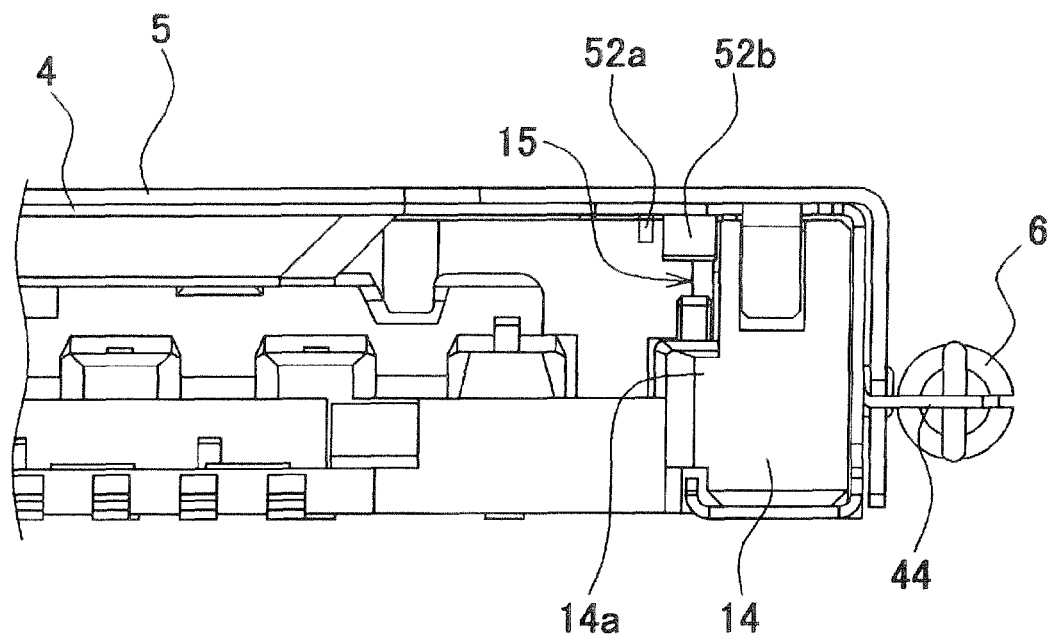
FIG. 9 is a partial enlarged view of FIG. 4.

Hereafter, a description will be given of an embodiment of the present invention with reference to FIGS. 1 to 23.

As shown in FIGS. 1 to 4, a connector 100 comprises a housing 1 and card-selecting means 3.

The connector 100 is mounted on a printed circuit board, not shown. The connector 100 electrically connects a first memory card (first card-type electronic component) 201 (see FIG. 13) or a second memory card (second card-type electronic component) 202 (see FIG. 14), and the printed circuit board. The second memory card 202 is substantially the same as the first memory card 201 in thickness, but has a width narrower than that of the first memory card 201, and a length shorter than that of the first memory card 201. The first memory card 201 includes e.g. an SD card, and the second memory card 202 includes e.g. a thin card.

The housing 1 is formed of a synthetic resin, and is substantially rectangle plate-shaped. The housing 1 has a first recess 11 and a second recess 12. The first memory card 201 is inserted in the first recess 11 (see FIG. 5). The first recess 11 has a bottom surface 11a and a pair of guiding surfaces 11b. The bottom surface 11a supports a lower surface of the first memory card 201. The guiding surfaces 11b are opposed to respective side surfaces of the first memory card 201 in a width direction DW of the housing 1 via a predetermined space in a manner capable of guiding the first memory card 201 in a card-inserting direction DI. The dimension of the depth of the first recess 11 is slightly larger than that of height of the first memory card 201.

The second recess 12 is formed in the bottom surface 11a of the first recess 11. The second memory card 202 is inserted in the second recess 12 (see FIG. 6). The second recess 12 has a bottom surface 12a and a pair of guiding surfaces 12b. The bottom surface 12a supports a bottom surface of the second memory card 202. The guiding surfaces 12b are opposed to respective side surfaces of the second memory card 202 in the direction DW of the width of the housing 1 via a predetermined space in a manner capable of guiding the second memory card 202 in the card-inserting direction DI. The dimension of the depth of the second recess 12 is smaller than that of the thickness of the second memory card 202.

The card-selecting means 3 comprises a cover member 4, a movable member 5, and a coil spring (urging member) 6.

The cover member 4 is formed by blanking and bending a thin metal plate. The cover member 4 is mounted and fixed to the housing 1 in a manner covering the first recess 11 of the housing 1. The cover member 4 has a top portion formed with a window 41. Further, the cover member 4 is formed with holes 42 and holes 45 in opposite ends of the top portion thereof, respectively. The holes 42 and the holes 45 are at locations frontward of a projecting portion 51, referred to hereinafter, respectively. The front side of the connector 100 is the lower side of the connector 100, as viewed in FIG. 3. Each of the holes 42 and an associated one of the holes 45 are arranged in the card-inserting direction DI, in a manner spaced from each other by a predetermined distance. The cover member 4 is formed with two protrusions 43 on each of opposite side surfaces thereof. The two protrusions 43 are arranged in the card-inserting direction DI in a manner spaced from each other by a predetermined distance. Further, the cover member 4 is formed with a hooking portion 44 on the left side surface thereof. The left side of the connector 100 is the right side of the connector 100, as viewed in FIG. 3.

Figure 10:
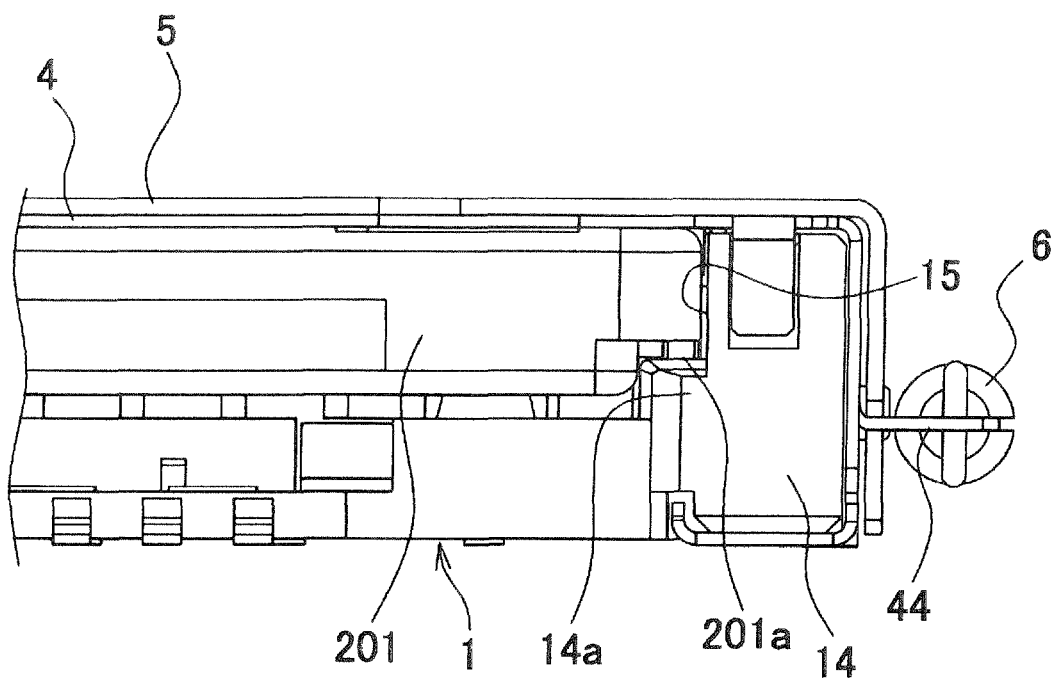
FIG. 10 is a partial enlarged view of the connector shown in FIG. 1 in an intermediate state in which the first memory card is being inserted in a first recess of the connector, as viewed from the front.
Figure 11:
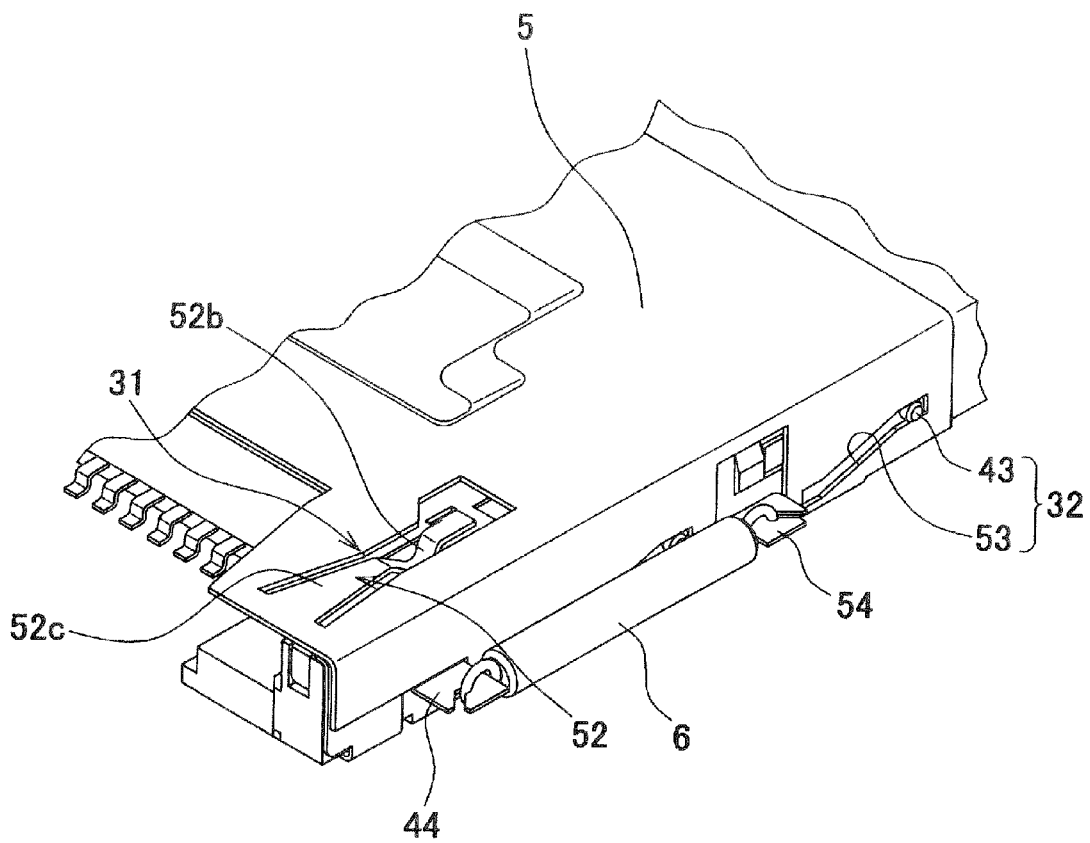
FIG. 11 is a partial enlarged view of FIG. 1.

The movable member 5 is formed by blanking and bending a thin metal plate. The movable member 5 is mounted on the cover member 4 in a manner movable in the card-inserting direction DI and a height direction DH of the housing 1, and can move between an initial position shown in FIGS. 1 and 19 before insertion of the first memory card 201 and a card insertion completion position shown in FIG. 22 after the insertion of the first memory card 201. The movable member 5 has a top portion formed with the projecting portion 51 protruding downward. The projecting portion 51 has an inclined surface 51a (see FIG. 7). As shown in FIGS. 2, 3, 8, 9, and 11, the movable member 5 has a pair of lock spring portions 52 formed on opposite ends of the top portion thereof. The pair of lock spring portions 52 are at locations frontward of the projecting portion 51, respectively. Each lock spring portion 52 is tang-shaped, and extends in the card-inserting direction DI. The distance between the pair of lock spring portions 52 is slightly narrower than the width of the first memory card 201. Each lock spring portion 52 includes a spring portion 52c which is continuous with the top portion of the movable member 5, a contact portion 52b which is continuous with the spring portion 52c, and a hook portion 52a which is continuous with the contact portion 52b. The hook portion 52a located at a front end of each lock spring portion 52 is bent toward the first recess 11, and protrudes into the first recess 11 through an associated one of the holes 42 of the cover member 4. The contact portion 52b, having an arcuate shape, curves in a manner protruding downward, and protrudes into the first recess 11 through an associated one of the holes 45 of the cover member 4. The contact portion 52b is at a location upward of a key 14a formed on a left side wall 14 of the housing 1 (see FIG. 9). The key 14a extends in the card-inserting direction DI (see FIG. 16), and is, as shown in FIG. 10, fitted in an associated one of cutouts 201a formed in opposite ends of the bottom of the first memory card 201.

The movable member 5 has opposite sides each formed with two cam holes 53. The longitudinal direction of each cam hole 53 is inclined with respect to the card-inserting direction DI by a predetermined angle. Each of the protrusions 43 of the cover member 4 is relatively movably inserted through an associated one of the cam holes 53. The movable member 5 has a hooking portion 54 formed on a left side surface thereof. The hooking portion 54 and the hooking portion 44 of the cover member 4 are apart from each other in the card-inserting direction DI by a predetermined distance.

One end of the coil spring 6 is hooked on the hooking portion 44 of the cover member 4, and the other end of the coil spring 6 is hooked on the hooking portion 54 of the movable member 5. This enables the coil spring 6 to urge the movable member 5 such that it is moved forward.

The holes 42 and 45 of the cover member 4, and the lock spring portions 52 of the movable member 5 form connecting means 31.

The protrusions 43 of the cover member 4 and the cam holes 53 of the movable member 5 form movement-converting means 32.

Figure 12:
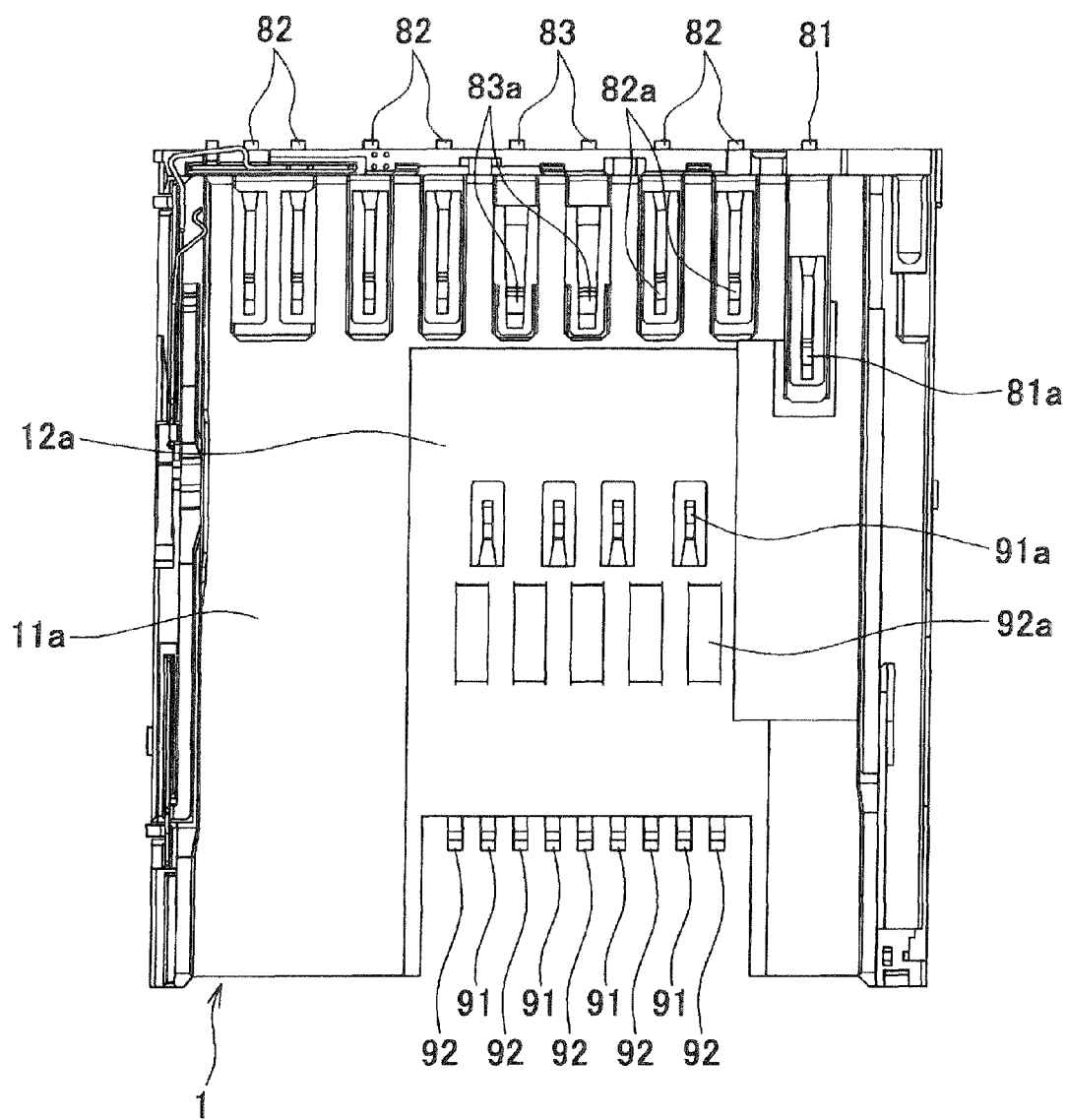
FIG. 12 is a plan view of a housing of the connector shown in FIG. 1.
Figure 13:
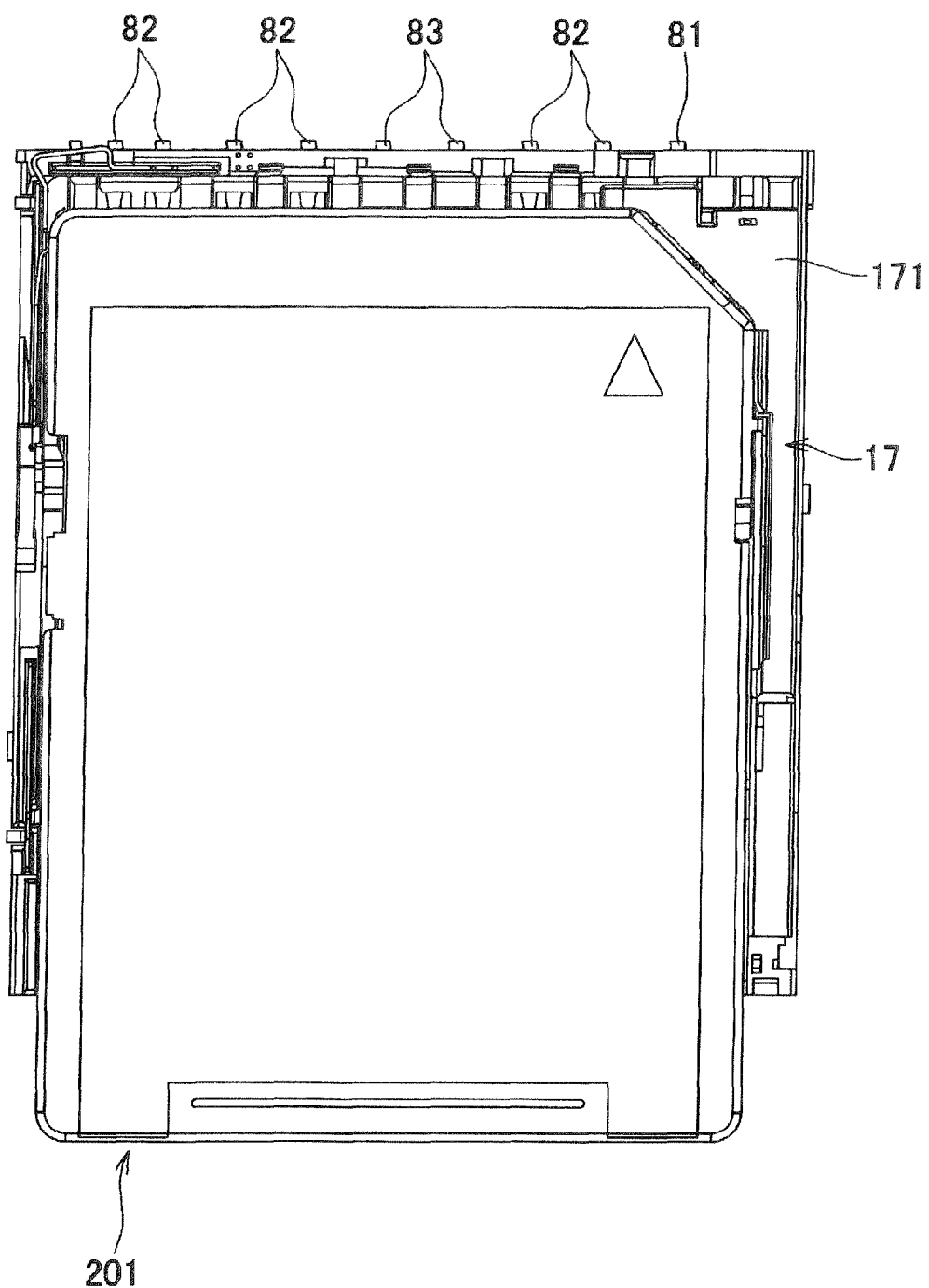
FIG. 13 is a plan view of the housing shown in FIG. 12 in a state in which the first memory card has been inserted therein.
Figure 14:
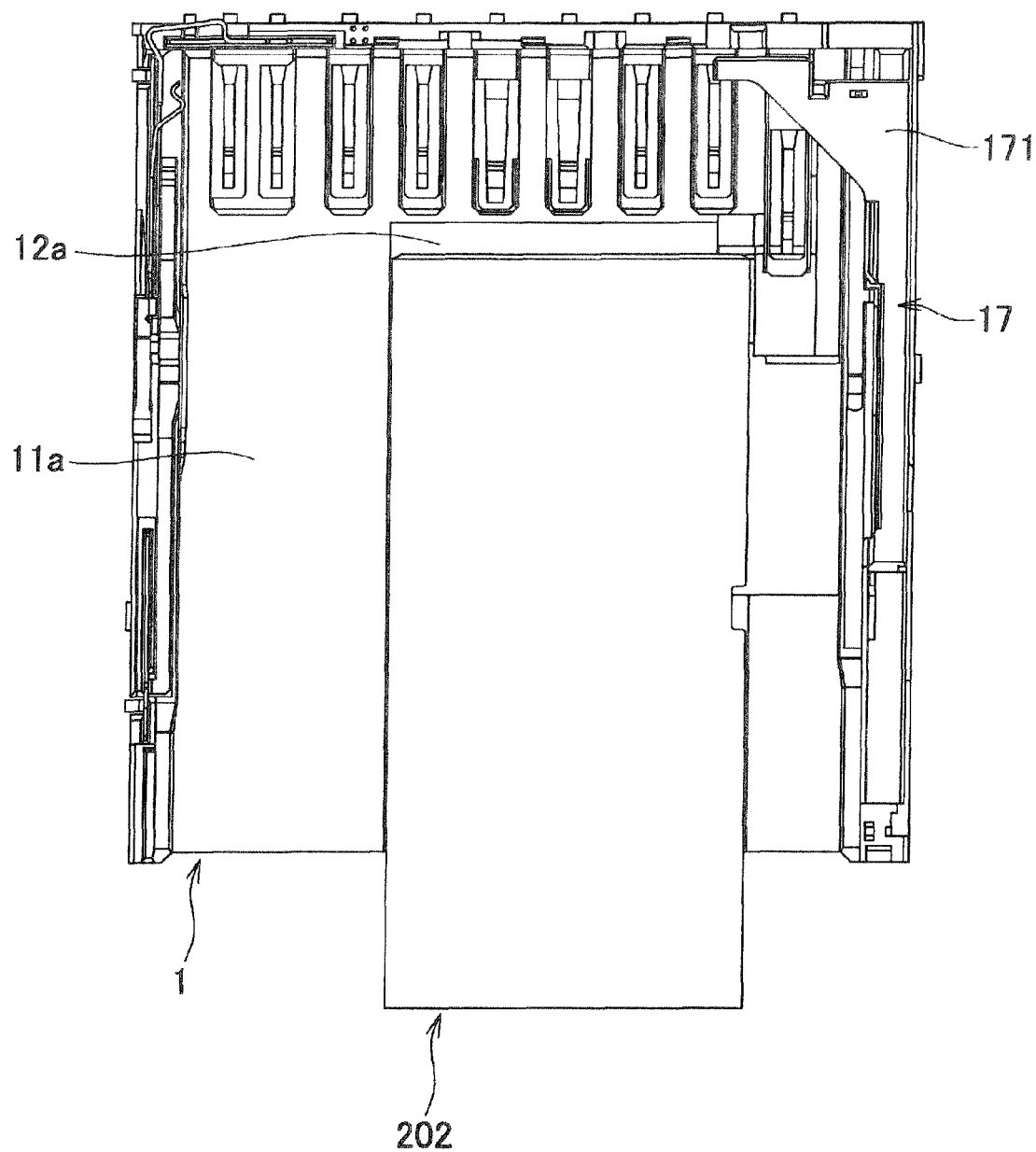
FIG. 14 is a plan view of the housing shown in FIG. 12 in a state in which the second memory card has been inserted therein.
Figure 15:
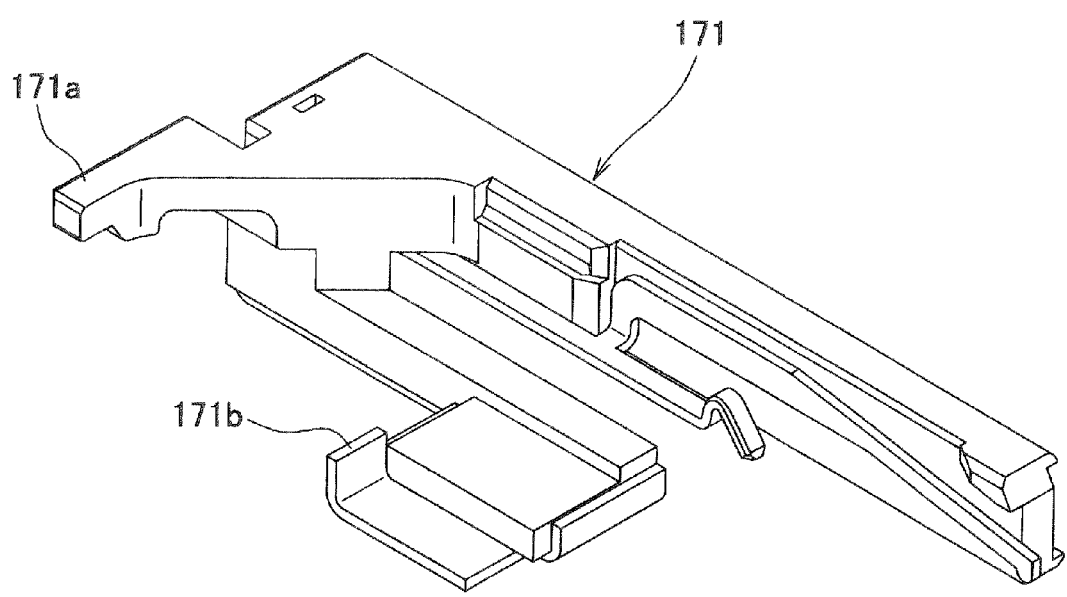
FIG. 15 is a perspective view of an eject bar of the connector shown in FIG. 1.
Figure 16:
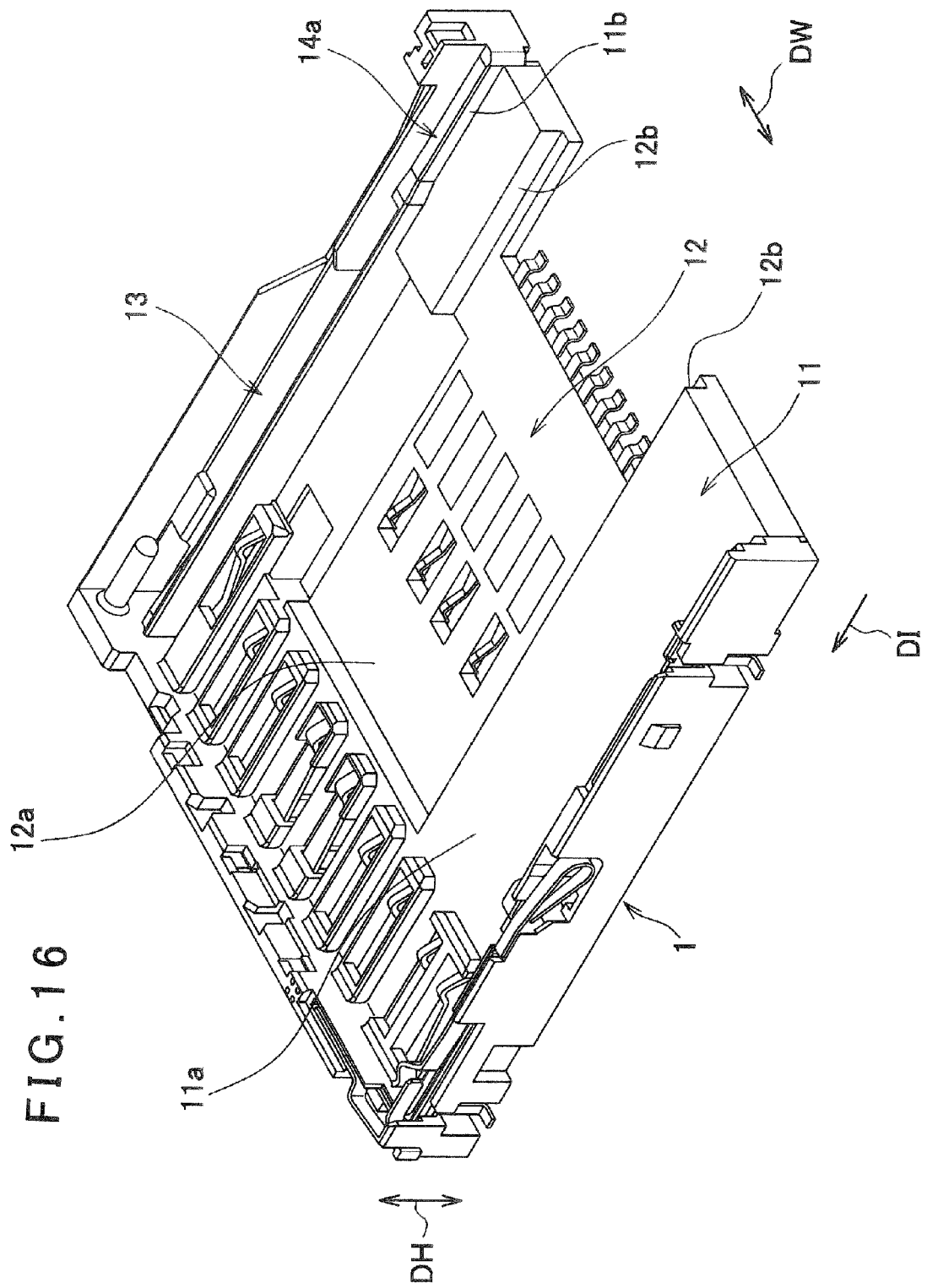
FIG. 16 is a perspective view of the housing of the connector shown in FIG. 1.
Figure 17:
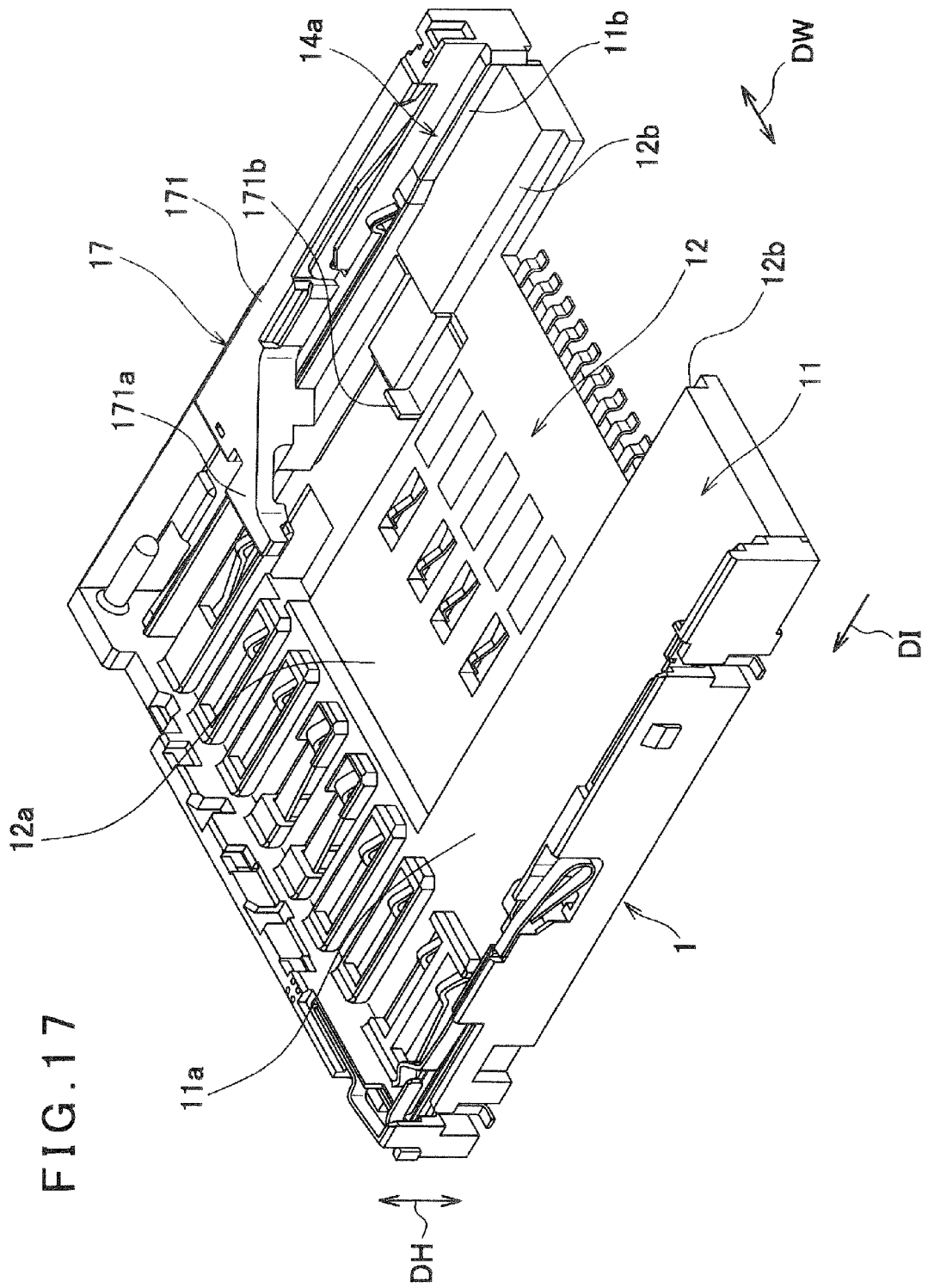
FIG. 17 is a perspective view of the eject bar assembled to the housing shown in FIG. 16 in a state in which the eject bar is in an ejecting position.
Figure 18:
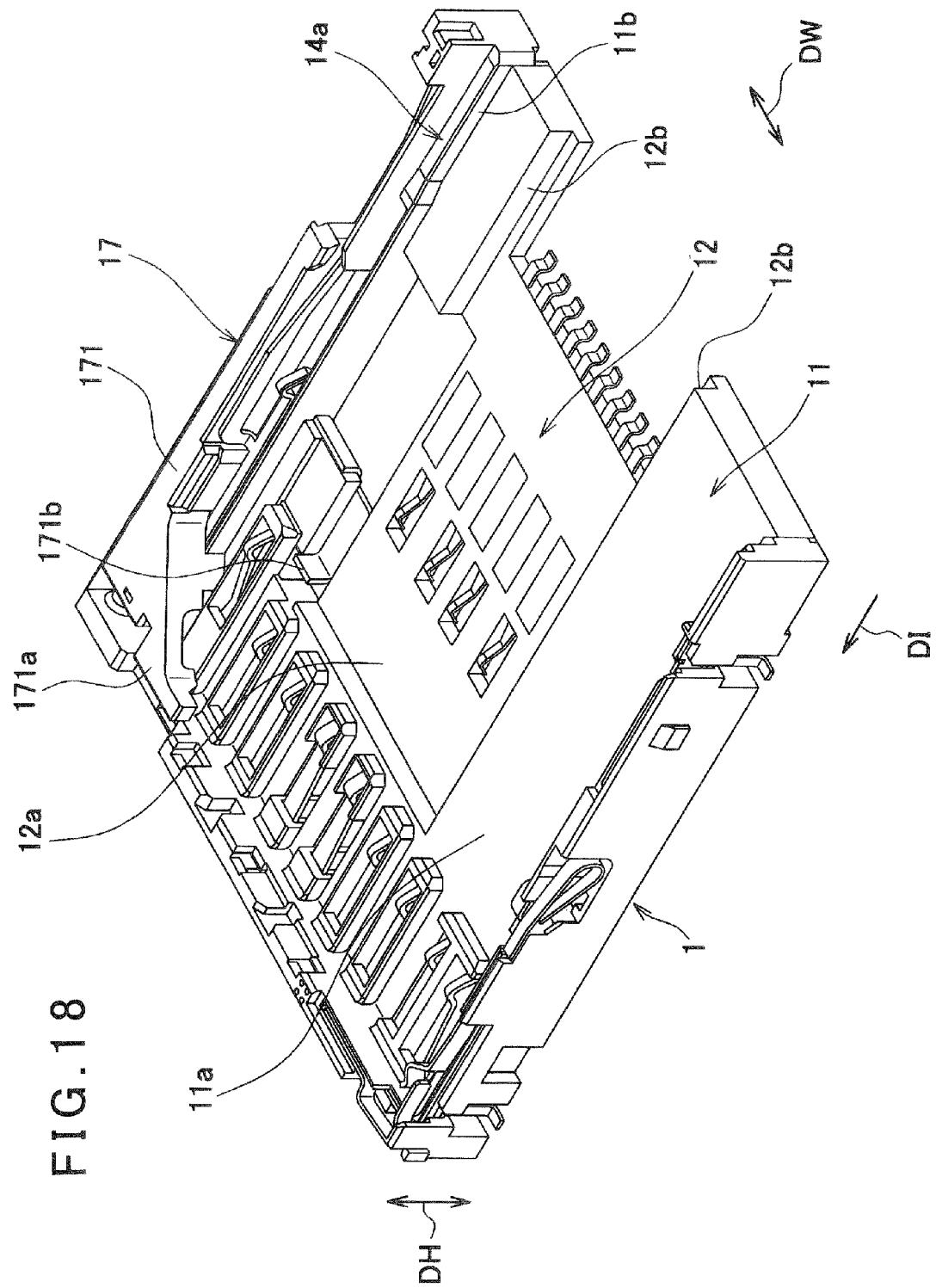
FIG. 18 is a perspective view of the eject bar assembled to the housing shown in FIG. 16 in a state in which the eject bar is in a fitting position.
Figure 19:
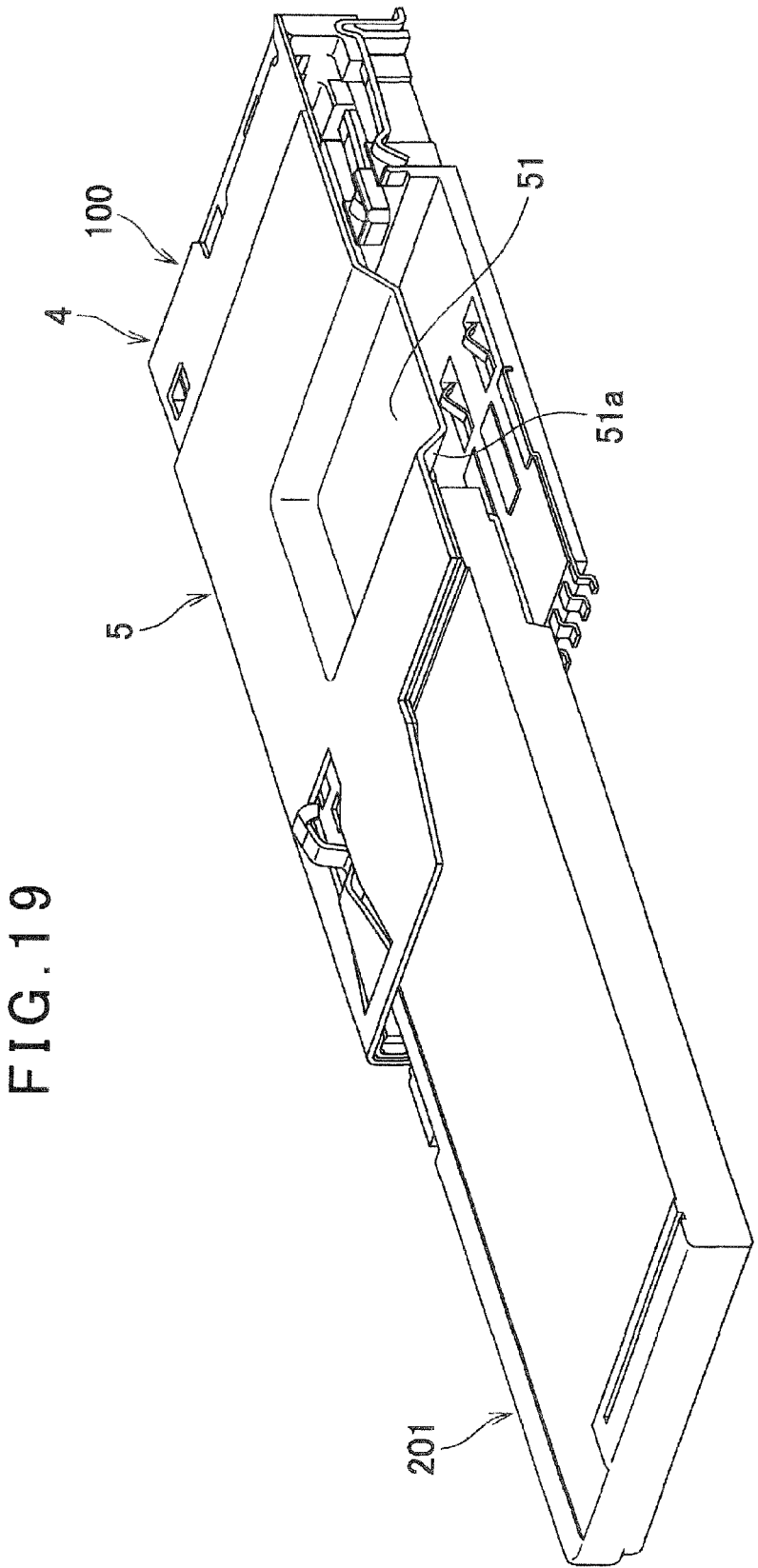
FIG. 19 is cutaway perspective view of the connector shown in FIG. 1 in a state in which a front end of the first memory card is inserted in the first recess of the connector.
Figure 20:
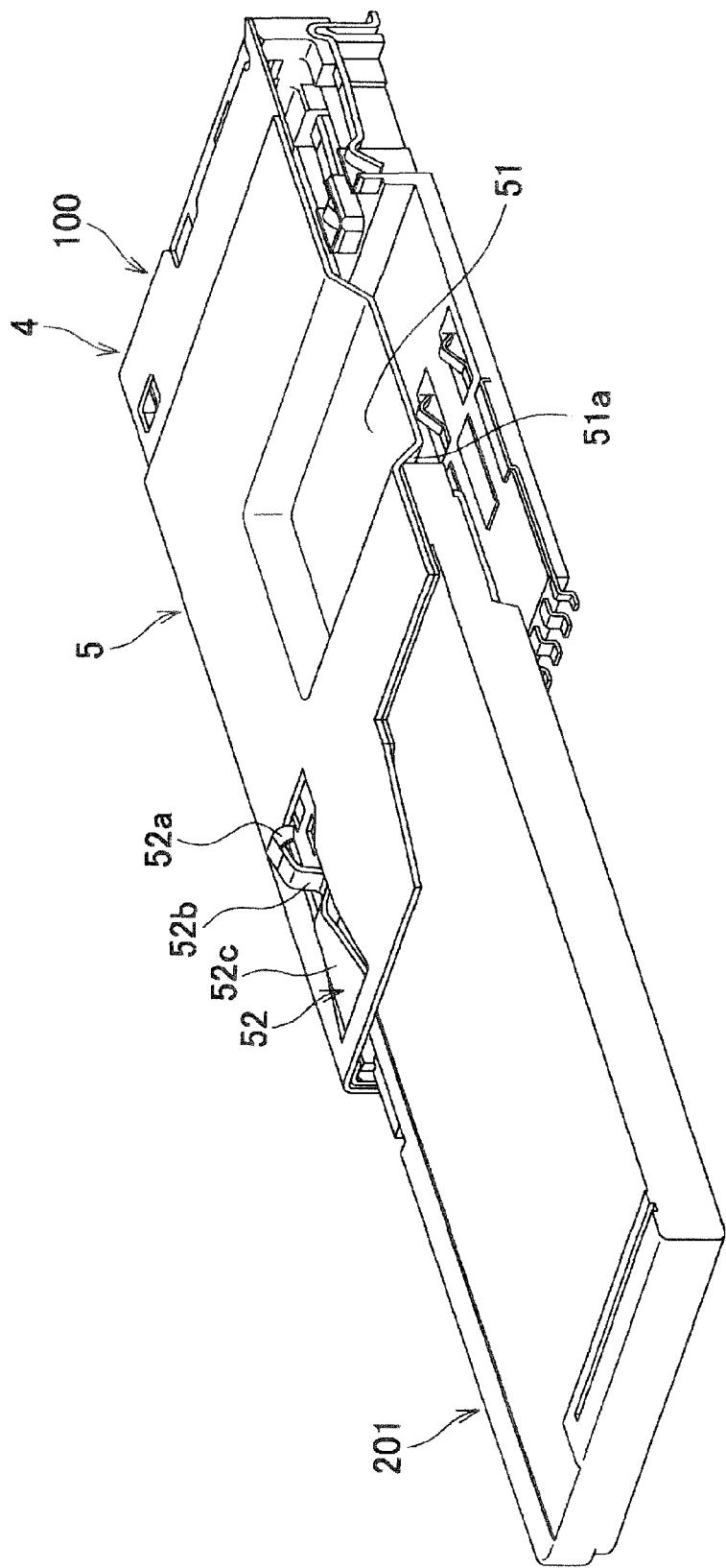
FIG. 20 is a cutaway perspective view of the connector shown in FIG. 1 in a state in which the front end of the first memory card is brought into abutment with a protruding portion the connector.
Figure 21:
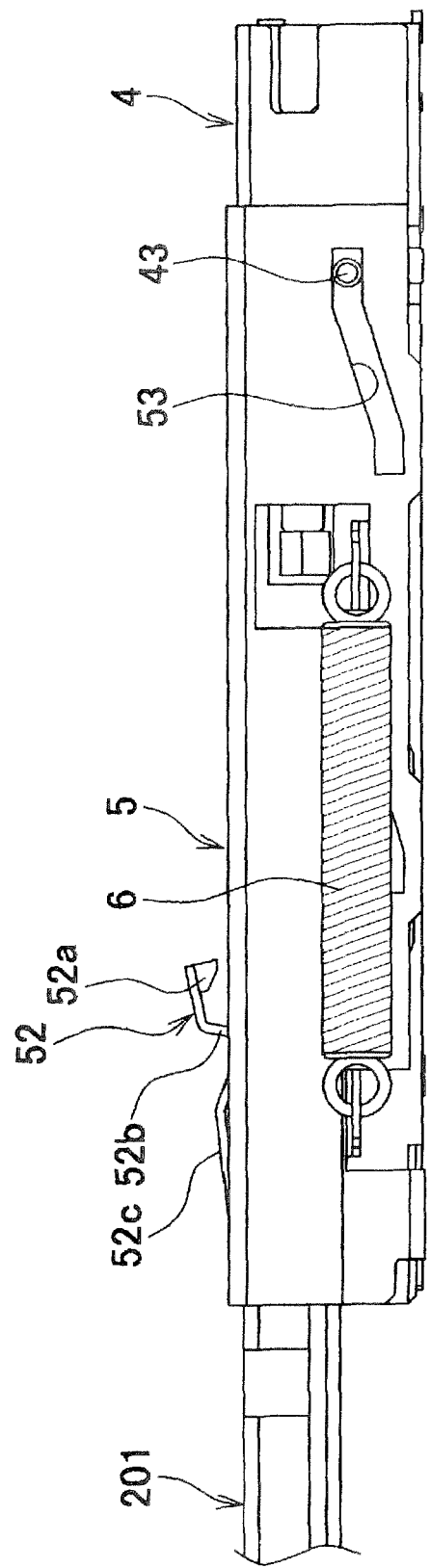
FIG. 21 is a side view of the connector shown in FIG. 20.
Figure 22:
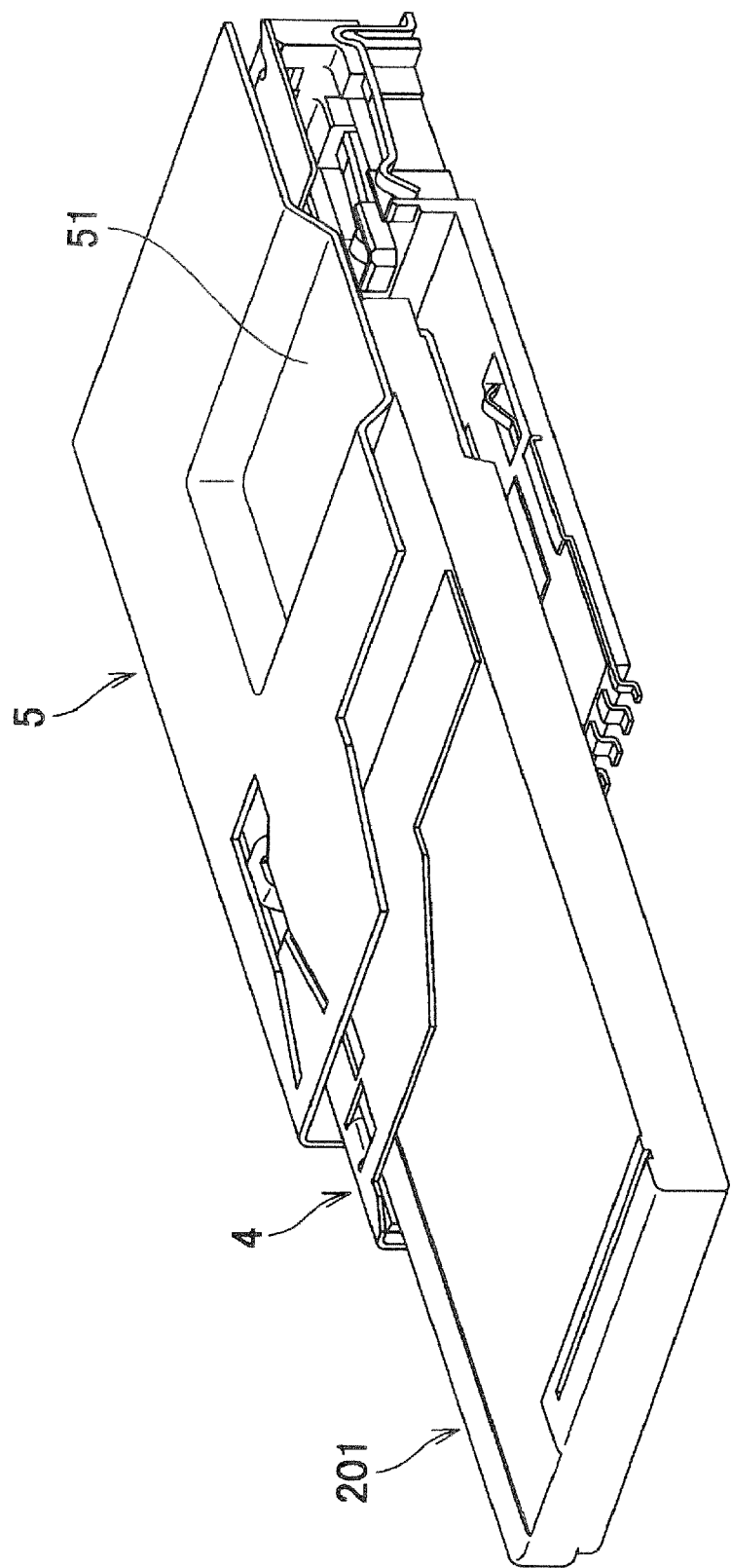
FIG. 22 is a cutaway perspective view of the connector shown in FIG. 1 in a state in which a movable member of the connector has moved up.
Figure 23:
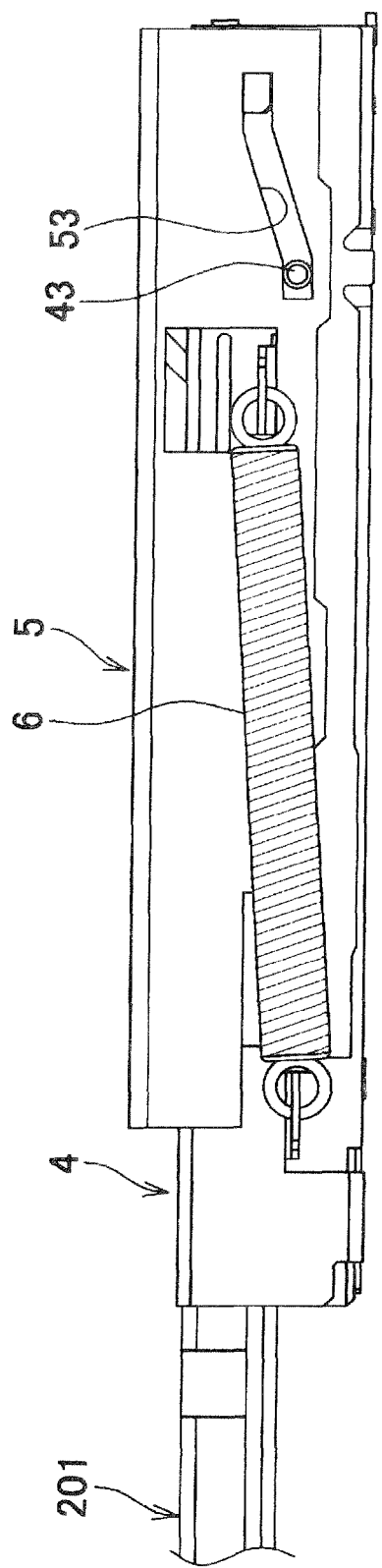
FIG. 23 is a side view of the connector shown in FIG. 22.
Figure 24:
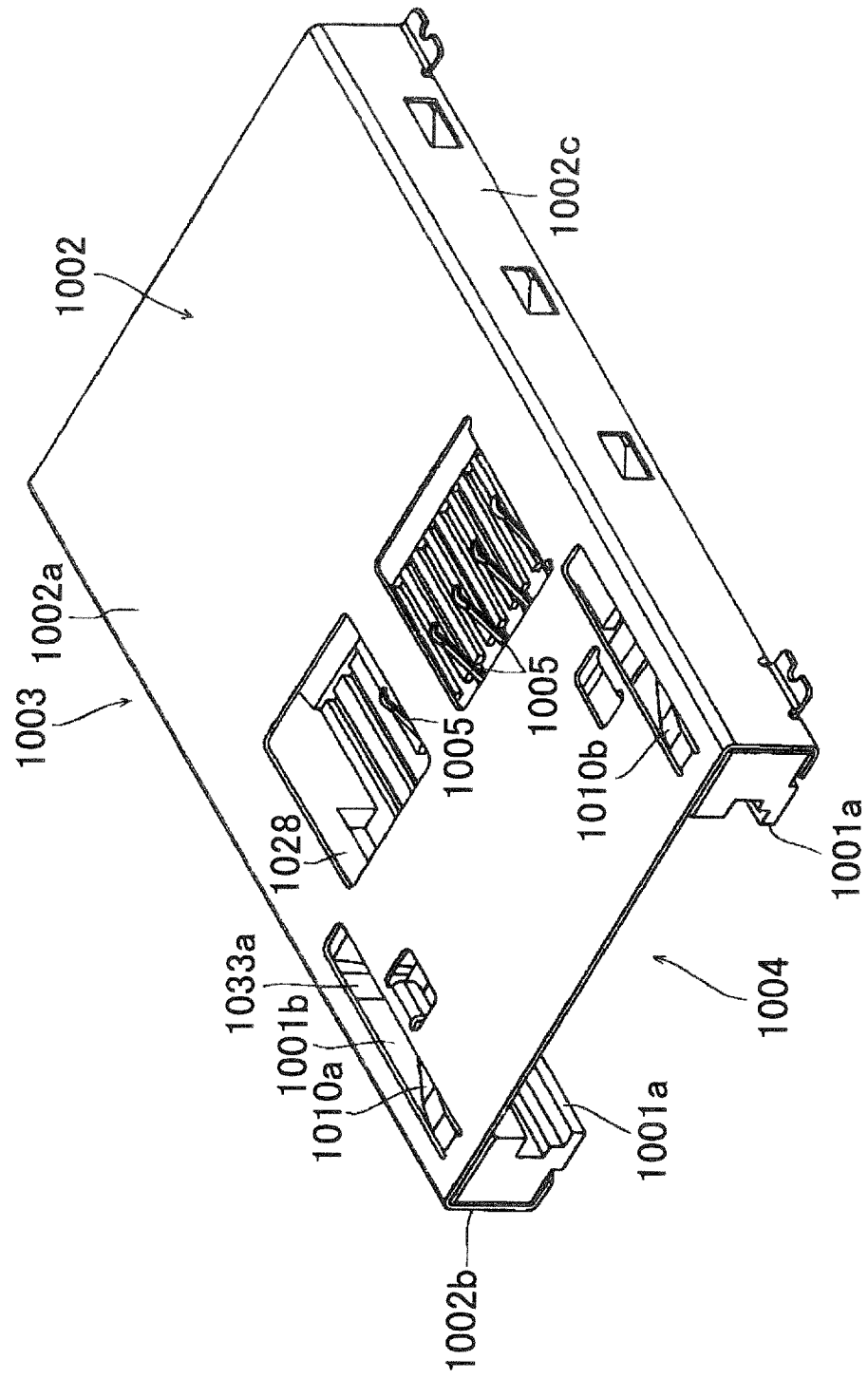
FIG. 24 is a perspective view of the appearance of a conventional card connector.
Figure 25:
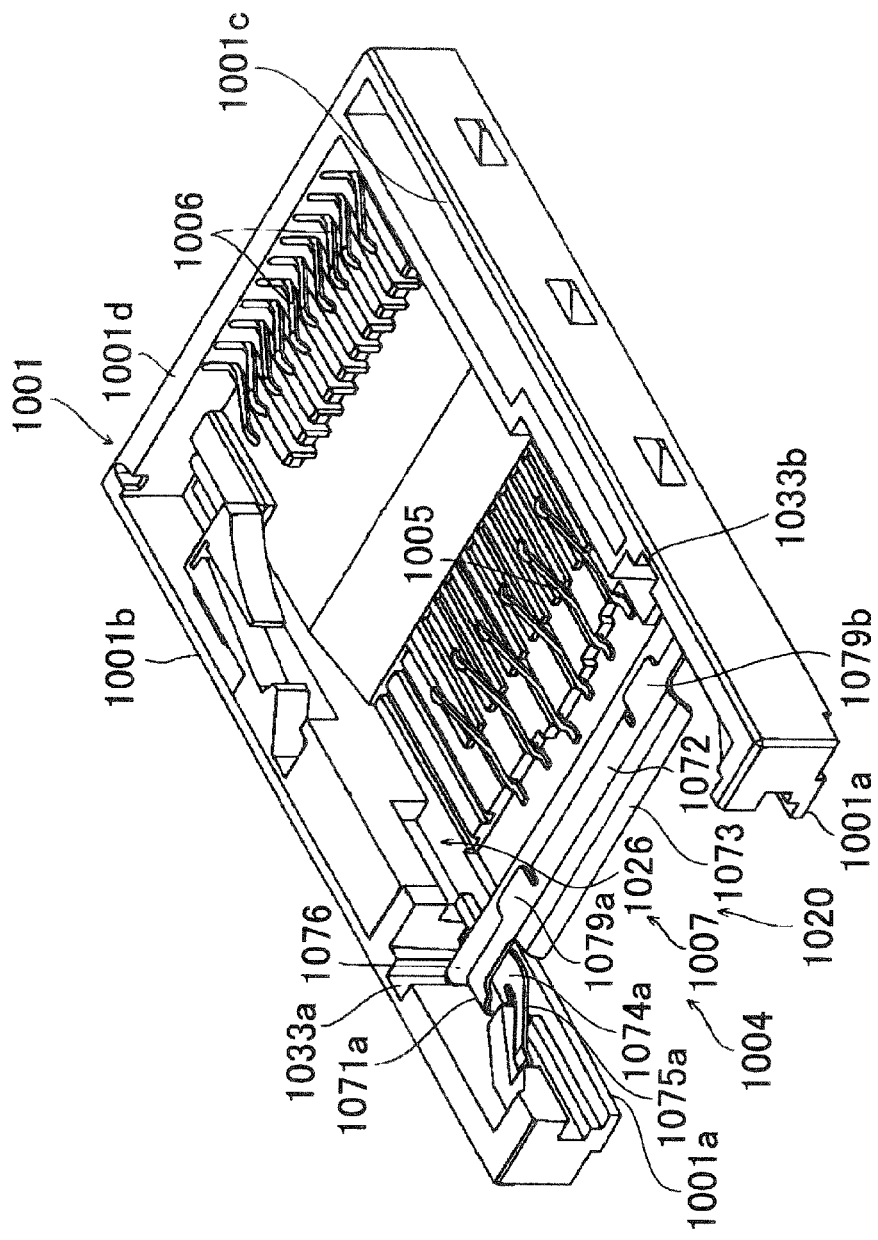
FIG. 25 is a perspective view of the appearance of the conventional card connector in a state in which a cover is removed from the card connector.
Figure 26A:
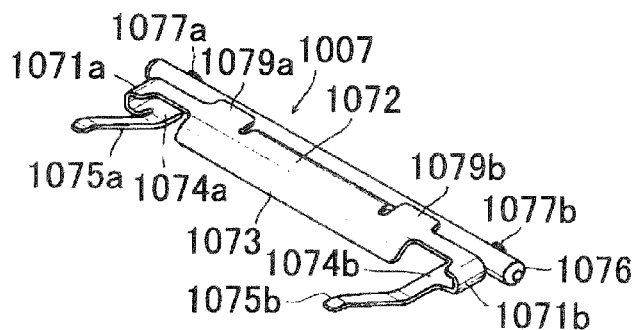
Figure 26B:
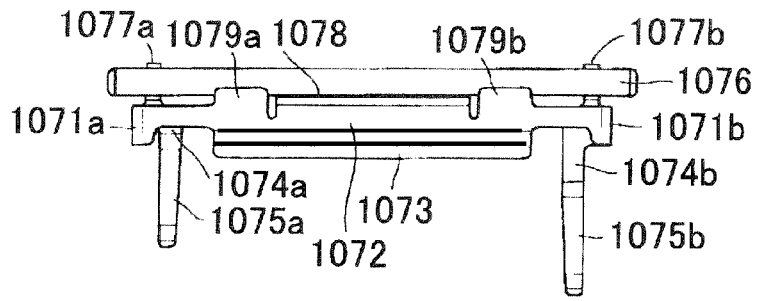
Figure 26C:
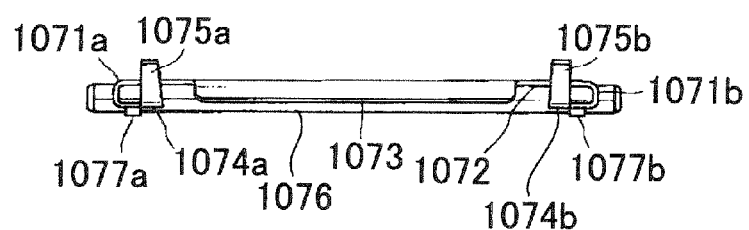
Figure 26D:
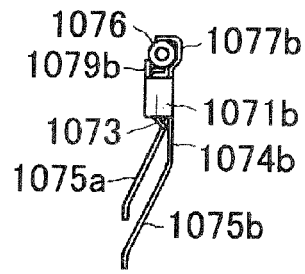
Figure 27:
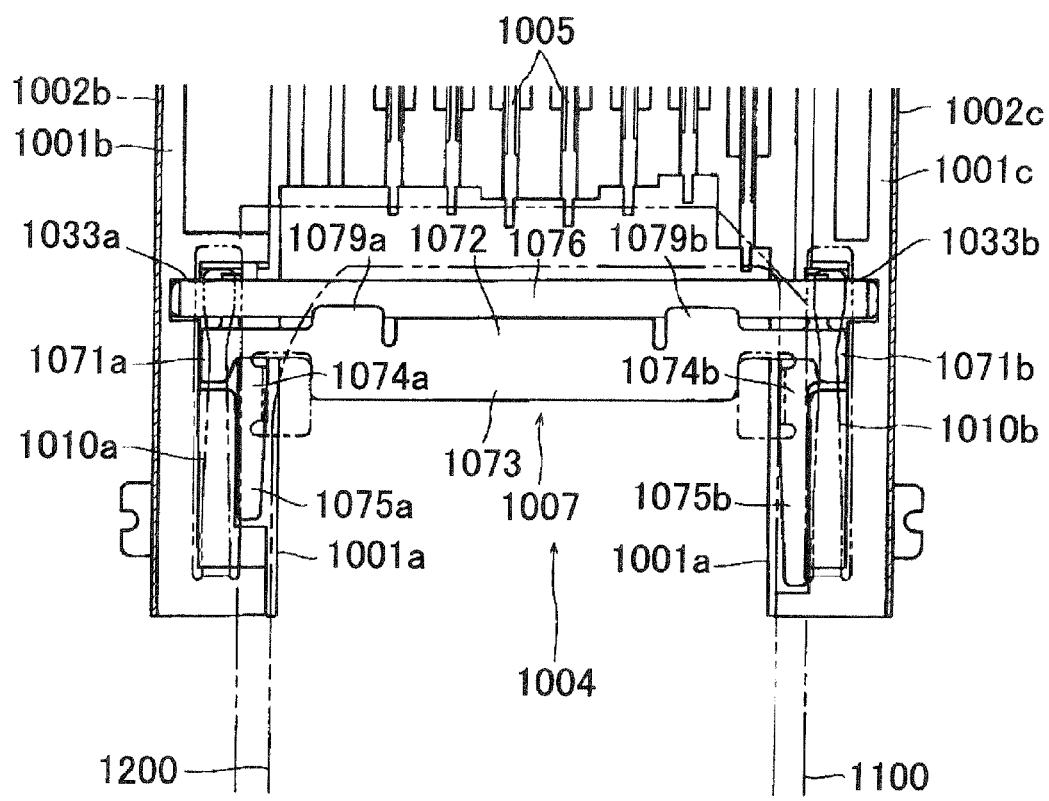
FIG. 27 is an explanatory plan view of a card selecting mechanism with the selector shaft.
Figure 28A:
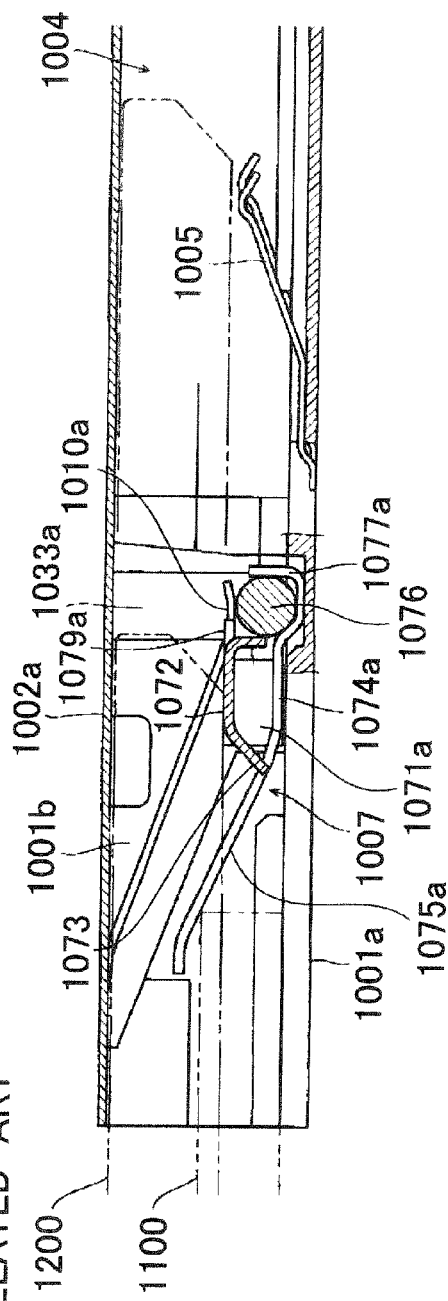
Figure 28B:
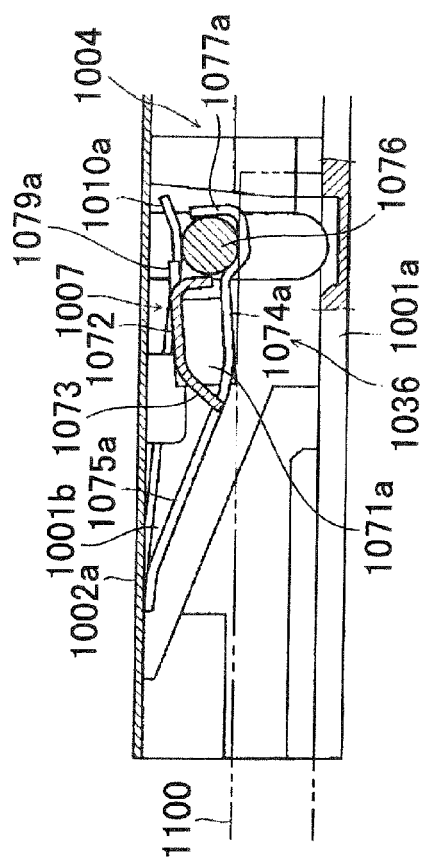

As shown in FIGS. 12, 13, and 14, the housing 1 holds contacts 81, 82, 83, 91, and 92.

The contacts 81, 82, and 83 are provided for the first memory card 201. The contacts 81 and 82 are for signals. The contacts 83 are for power supply.

The contacts 91 and 92 are provided for the second memory card 202. Contact portions 91a and 92a of the contacts 91 and 92 have a height dimension which is smaller in value than a depth dimension of the second recess 12. The contact portions 91a and 92a of the contacts 91 and 92 are at locations frontward of contact portions 81a, 82a, and 83a of the contacts 81, 82, and 83.

As shown in FIGS. 15 to 18, an ejection mechanism 17 is similar to a known ejection mechanism including a rod, an urging member, etc., none of which are shown, except that a shape of part of an eject bar 171 is different, as described below, and hence only different points from the known ejection mechanism will be described.

The eject bar 171 includes a first abutment portion 171a and a second abutment portion 171b provided to enable discharge of the first memory card 201 inserted in the first recess 11 and the second memory card 202 inserted in the second recess 12. The first abutment portion 171a and the second abutment portion 171b are apart from each other in the card-inserting direction DI. The eject bar 171 is accommodated in an accommodating portion 13 (see FIG. 16) of the housing 1 in a manner capable of moving along the card-inserting direction DI (see FIGS. 17 and 18). In a state in which the eject bar 171 is accommodated in the accommodating portion 13, the first abutment portion 171a protrudes into the first recess 11, and the second abutment portion 171b protrudes into the second recess 12.

Next, a description will be given of a movement of the connector 100 when the first memory card 201 is inserted into the connector 100 with reference to FIGS. 19 to 23.

When the first memory card 201 and the second memory card 202 are not inserted in the connector 100, the hook portion 52a of each lock spring portion 52 of the movable member 5 is engaged with the associated one of the holes 42 of the cover member 4 (see FIG. 3), whereby the movable member 5 is in a state connected with the cover member 4, which prevents the movable member 5 from moving. Further, at this time, each protrusion 43 in the associated one of the cam holes 53 is in a lowest position, and hence the movable member 5 is in a position closest to the cover member 4.

When the front end of the first memory card 201 is inserted in the first recess 11 against the urging force of the coil spring 6 (see FIG. 19), the front end flips up the contact portion 52b of each lock spring 52 from the first recess 11 (see FIGS. 20 and 21), whereby the hook portion 52a of each lock spring portion 52 is removed from the associated hole 42. As a result, the engagement (locked state) of the movable member 5 and the cover member 4 is released, which enables the movable member 5 to move.

When the front end of the first memory card 201 is brought into abutment with the projecting portion 51 of the movable member 5, the first memory card 201 pushes the movable member 5 to cause the same to move rearward. At this time, the protrusions 43 within the respective cam holes 53 relatively move forward. Since the longitudinal direction of each cam hole 53 is inclined with respect to the card-inserting direction DI, the movable member 5 moves upward.

When the movable member 5 has moved upward, the projecting portion 51 retreats upward from the first recess 11, so that nothing prevents the first memory card 201 from being inserted, which makes it possible to insert the first memory card 201 in the first recess 11. When the first memory card 201 has been inserted, the front end of the first memory card 201 is sandwiched between the lower surface of the projecting portion 51 and the bottom surface 11a of the first recess 11, so that flat electrodes (not shown) of the first memory card 201 are brought into contact with the contact portions 81a, 82a, and 83a of the contacts 81, 82, and 83, and as a result the first memory card 201 is electrically connected to the printed circuit board. Further, when the first memory card 201 is sandwiched between the lower surface of the projecting portion 51 and the bottom surface 11a of the first recess 11, the movable member 5 is urged by the spring force of the coil spring 6 such that it is to be moved forward, and the protrusions 43 are about to relatively move back within the respective cam holes 53 to push the movable member 5 downward. However, since the lower surface of the projecting portion 51 is in contact with the upper surface of the first memory card 201, the projecting portion 51 cannot push the movable member 5 downward, so that the protrusions 43 are prevented by the inclined surfaces of the respective cam holes 53 from moving, and hence the movable member 5 cannot move.

If the first memory card 201 is tilted due to some cause when it is being inserted into the first recess 11, the lower surface 11a of the first recess 11 receives the front end of the first memory card 201, which is about to move downward. The upper surface of the cover member 4 and the upper surface of the movable member 5 receive the front end of the first memory card 201, which is about to move upward.

To insert the second memory card 202 into the connector 100, it is only necessary to put the front end of the second memory card 202 in the second recess 12 and insert the second memory card 202 into the second recess 12.

At this time, since the front end of the second memory card 202 cannot be brought into contact with the contact portions 52b of the lock spring portions 52, the locked state of the movable member 5 with respect to the cover member 4 is maintained.

When the second memory card 202 has been inserted, the second memory card 202 is sandwiched between the projecting portion 51 and the bottom surface 12a of the second recess 12, so that flat electrodes (not shown) or three-dimensional electrodes (not shown) of the second memory card 202 are brought into contact with the contact portions 91a and 92a of the contacts 91 and 92, and as a result, the second memory card 202 is electrically connected to the printed circuit board.

If the second memory card 202 is tilted when it is being inserted in the second recess 12, the bottom surface 12a of the second recess 12 receives the front end of the second memory card 202, which is about to move downward. The upper surface of the cover member 4 and the upper surface of the movable member 5 receive the front end of the second memory card 202, which is about to move upward. However, assuming that the second memory card 202 is inclined when the front end of the second memory card 202 reaches the projecting portion 51 of the movable member 5, the projecting portion 51 of the movable member 5 receives the front end of the second memory card 202.

Even when a user tries to insert the front end of the second memory card 202 into the first recess 11, the front end of the second memory card 202 is brought into abutment with the projecting portion 51, which prevents the second memory card 202 from being inserted, and hence the user immediately recognizes that he/she has attempted to insert the second memory card 202 into a wrong place.

Since the bottom surface of the first memory card 201 is formed with the cutouts 201a (see FIG. 10), the opposite side portions of the first memory card 201 each move into a space 15 between the cover member 4 and the key 14a, and push up the contact portions 52b of the lock spring portions 52 to thereby remove the hook portions 52a from the holes 42, which makes it possible to release the connected state of the movable member 5 and the cover member 4. On the other hand, the bottom surface of the second memory card 202 is not formed with cutouts, the opposite side portions of the second memory card 202 each cannot move into the space 15 between the cover member 4 and the key 14a. Therefore, even when the front end of the second memory card 202 moves into the first recess 11, the second memory card 202 cannot push up the contact portions 52b of the lock spring portions 52, so that the projecting portion 51 prevents insertion of the second memory card 202.

To discharge the first memory card 201 inserted in the first recess 11, the first memory card 201 is pushed in with a finger in the inserting direction DI. By this operation, the eject bar 171 is pushed by the first memory card 201 whereby it is moved back deep into the accommodating portion 13 of the housing 1, whereby the locked state of the eject bar 171 is released. When the finger is removed from the first memory card 201, the eject bar 171 returns to the original position by the urging force of the urging member of the ejection mechanism 17. At this time, the first abutment portion 171a of the eject bar 171 pushes out the first memory card 201.

Similarly, also in discharging the second memory card 202 inserted in the second recess 12, it is only necessary to do the same operation as that for discharging the first memory card 201. The second abutment portion 171b of the eject bar 171 pushes out the second memory card 202.

According to the present embodiment, even when the first memory card 201 or the second memory card 202 is obliquely inserted into the housing 1, the front end of the first memory card 201 or second memory card 202, which is about to move downward, is received by the bottom surface 11a or 12a of the first recess 11 or second recess 12, which makes it less difficult to insert the first memory card 201 or the second memory card 202 even if the connector 100 is used over a long term. Further, it is possible to dispense with the selector 7 of the conventional card connector, which is liable to be deformed.

Further, the contact portions 91a and 92a of the contacts 91 are arranged on the bottom surface 12a of the second recess 12, and the height of the contact portions 91a and 92a is made smaller in value than the depth of the second recess 12, so that when the first memory card 201 is inserted in the first recess 11, the first memory card 201 is not brought into contact with the contact portions 91a and 92a, which makes it possible to protect the contact portions 91a and 92a.

It should be noted that the urging member is not limited to the coil spring 6.

Further, the connecting means 31 is not limited to that formed by the lock spring portions 52 and the holes 42 and 45.

It should be noted that as a variation of the above-described embodiment, the movement-converting means 32 may be formed by cam holes formed in the cover member 4, and protrusions formed on the movable member 5, for example.

It is further understood by those skilled in the art that the foregoing are the preferred embodiments of the present invention, and that various changes and modification may be made thereto without departing from the spirit and scope thereof.

What is claimed is:

1. A connector comprising: a housing that has a first recess for having a first card-type electronic component inserted therein, and a second recess which is formed in a bottom surface of the first recess, for having a second card-type electronic component inserted therein, and is smaller in width than the first card-type electronic component, the first recess having a guiding surface for guiding the first card-type electronic component in a card-inserting direction, the second recess having a guiding surface for guiding the second card-type electronic component in the card-inserting direction; and card-selecting means for restricting movement of the first card-type electronic component inserted in the first recess in a height direction of said housing, restricting movement of the second card-type electronic component inserted in the second recess in the height direction, allowing the first card-type electronic component to be inserted into the first recess, and preventing the second card-type electronic component from being inserted in the first recess;

wherein said card-selecting means comprises: a cover member that is mounted on said housing in a manner covering the first recess; a movable member that includes a projecting portion which protrudes into the first recess through a window formed in the cover member, prevents the second card-type electronic component inserted in the second recess from moving in the height direction, prevents the second card-type electronic component from being inserted into the first recess, and is mounted on the cover member in a manner capable of moving in the card-inserting direction and the height direction;

an urging member for urging the movable member in a card-discharging direction when the movable member is moved in the card-inserting direction with respect to the cover member;

connecting means for connecting the cover member and the movable member to each other, and releasing connection of the cover member and the movable member to enable the movable member to move, when a front end of the first card-type electronic component is inserted into the first recess; and movement conversion means operable when the movable member is moved in the card-inserting direction together with the first card-type electronic component after the connection of the cover member and the movable member is released and the first card-type electronic component is brought into abutment with the projecting portion, to convert movement of the movable member in the card-inserting direction to movement in the height direction to thereby move the movable member in the height direction.

2. The connector as claimed in claim 1, wherein first contact portions are arranged on the bottom surface of the first recess, for being brought into contact with the first card-type electronic component, wherein second contact portions are arranged on a bottom surface of the second recess at locations frontward of the first contact portions, for being brought into contact with the second card-type electronic component, and wherein each second contact portion has a height dimension smaller in value than a depth dimension of the second recess.

3. The connector as claimed in claim 1, wherein said movement conversion means comprises protrusions formed on opposite side surfaces of the cover member, and cam holes formed in opposite sides of the movable member, such that the protrusions relatively slide therein when the movable member is moved.

4. The connector as claimed in claim 3, wherein first contact portions are arranged on the bottom surface of the first recess, for being brought into contact with the first card-type electronic component, wherein second contact portions are arranged on a bottom surface of the second recess at locations frontward of the first contact portions, for being brought into contact with the second card-type electronic component, and wherein each second contact portion has a height dimension smaller in value than a depth dimension of the second recess.

5. The connector as claimed in claim 1, wherein said movement conversion means comprises cam holes formed in opposite sides of the cover member, and protrusions formed on opposite side surfaces of the movable member, such that the protrusions relatively slide in the cam holes when the movable member is moved.

6. The connector as claimed in claim 5, wherein first contact portions are arranged on the bottom surface of the first recess, for being brought into contact with the first card-type electronic component, wherein second contact portions are arranged on a bottom surface of the second recess at locations frontward of the first contact portions, for being brought into contact with the second card-type electronic component, and wherein each second contact portion has a height dimension smaller in value than a depth dimension of the second recess.

7. The connector as claimed in claim 1, wherein said connection means includes lock spring portions which are formed on the movable member and are each bent in a manner protruding into the first recess, and holes which are formed in the cover member, and are each capable of being engaged with a hook portion formed on a front end of each lock spring portion, and wherein when the front end of the first card-type electronic component is inserted into the first recess against the urging force of the urging member, the engagement of the hook portions of the lock spring portions and the holes is released, to thereby release the connection of the cover member and the movable member, and when the first card-type electronic component is discharged from the first recess, the urging force of the urging member causes the movable member to return to a position before inserting the first card-type electronic component, and the hook portions of the lock spring portions and the holes are engaged with each other, to thereby connect the cover member and the movable member.

8. The connector as claimed in claim 7, wherein first contact portions are arranged on the bottom surface of the first recess, for being brought into contact with the first card-type electronic component, wherein second contact portions are arranged on a bottom surface of the second recess at locations frontward of the first contact portions, for being brought into contact with the second card-type electronic component, and wherein each second contact portion has a height dimension smaller in value than a depth dimension of the second recess.

9. The connector as claimed in claim 7, wherein said movement conversion means comprises protrusions formed on opposite side surfaces of the cover member, and cam holes formed in opposite sides of the movable member, such that the protrusions relatively slide therein when the movable member is moved.

10. The connector as claimed in claim 9, wherein first contact portions are arranged on the bottom surface of the first recess, for being brought into contact with the first card-type electronic component, wherein second contact portions are arranged on a bottom surface of the second recess at locations frontward of the first contact portions, for being brought into contact with the second card-type electronic component, and wherein each second contact portion has a height dimension smaller in value than a depth dimension of the second recess.

11. The connector as claimed in claim 7, wherein said movement conversion means comprises cam holes formed in opposite sides of the cover member, and protrusions formed on opposite side surfaces of the movable member, such that the protrusions relatively slide in the cam holes when the movable member is moved.

12. The connector as claimed in claim 11, wherein first contact portions are arranged on the bottom surface of the first recess, for being brought into contact with the first card-type electronic component, wherein second contact portions are arranged on a bottom surface of the second recess at locations frontward of the first contact portions, for being brought into contact with the second card-type electronic component, and wherein each second contact portion has a height dimension smaller in value than a depth dimension of the second recess.

* * * * *